US011668975B2

(12) United States Patent
Walker et al.

(10) Patent No.: US 11,668,975 B2
(45) Date of Patent: *Jun. 6, 2023

(54) EDGE-LIT BACK LIGHT UNIT WITH IMPROVED EFFICIENCY

(71) Applicant: BrightView Technologies, Inc., Durham, NC (US)

(72) Inventors: Kenneth L. Walker, Semora, NC (US); Bing A. Shen, Durham, NC (US); Matthew K. Pope, Durham, NC (US)

(73) Assignee: BrightView Technologies, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,170

(22) Filed: Dec. 16, 2021

(65) Prior Publication Data

US 2022/0197086 A1 Jun. 23, 2022

Related U.S. Application Data

(60) Provisional application No. 63/214,730, filed on Jun. 24, 2021, provisional application No. 63/127,325, filed on Dec. 18, 2020.

(51) Int. Cl.
*G02F 1/13357* (2006.01)
*F21V 8/00* (2006.01)
*G02F 1/1335* (2006.01)

(52) U.S. Cl.
CPC ...... *G02F 1/133603* (2013.01); *G02B 6/0011* (2013.01); *G02F 1/133524* (2013.01); *G02F 1/133607* (2021.01); *G02F 1/133615* (2013.01)

(58) Field of Classification Search
CPC ......... G02F 1/133603; G02F 1/133607; G02F 1/133524; G02F 1/133615; G02B 6/0011
See application file for complete search history.

(56) References Cited

U.S. PATENT DOCUMENTS

| 7,763,417 | B2 | 7/2010 | Rinehart et al. |
| 11,181,776 | B2 * | 11/2021 | Walker .............. G02F 1/133611 |
| 2002/0003593 | A1 * | 1/2002 | Arakawa .............. G02B 5/3016 |
| | | | 349/96 |
| 2007/0086086 | A1 | 4/2007 | Cassarly et al. |

(Continued)

FOREIGN PATENT DOCUMENTS

| WO | 2018/006288 A1 | 1/2018 |
| WO | 2019/006288 A1 | 1/2019 |

(Continued)

OTHER PUBLICATIONS

International Search Report and Written Opinion received for PCT Patent Application No. PCT/US2021/063793, dated Apr. 12, 2022, 7 pages.

*Primary Examiner* — Mary Ellen Bowman
(74) *Attorney, Agent, or Firm* — Rauschenbach Patent Law Group, PLLC; Kurt Rauschenbach

(57) ABSTRACT

An edge-lit back light unit for a backlit display includes a reflector, an edge-lit light guide film, a diffuser film, and a pair of crossed brightness enhancement films with increased efficiency. The diffuser film has an angular light distribution output that is matched to light acceptance angles of the pair of crossed brightness enhancement films to provide increased on-axis brightness without having to increase power to the edge-lit back light unit.

37 Claims, 19 Drawing Sheets

(56) References Cited

U.S. PATENT DOCUMENTS

| | | |
|---|---|---|
| 2010/0265435 A1 | 10/2010 | Hwang et al. |
| 2010/0321609 A1 | 12/2010 | Qi et al. |
| 2011/0141412 A1* | 6/2011 | Lee .................. G02F 1/133621 |
| | | 349/106 |
| 2011/0261584 A1 | 10/2011 | Boyd et al. |
| 2011/0310332 A1 | 12/2011 | Boyd et al. |
| 2017/0153383 A1* | 6/2017 | Lee ...................... G02B 6/0068 |
| 2020/0408383 A1 | 12/2020 | Shen et al. |
| 2021/0156539 A1 | 5/2021 | Purchase et al. |
| 2021/0231290 A1 | 7/2021 | Aspell et al. |
| 2021/0232004 A1 | 7/2021 | Aspell et al. |

FOREIGN PATENT DOCUMENTS

| | | |
|---|---|---|
| WO | 2021/150813 A1 | 7/2021 |
| WO | 2022/133080 A1 | 6/2022 |

* cited by examiner

EDGE-LIT BACK LIGHT UNIT WITH IMPROVED EFFICIENCY

CROSS-REFERENCE TO RELATED APPLICATIONS

This application claims the benefit of priority from U.S. Provisional Patent Application Ser. No. 63/127,325, filed Dec. 18, 2020 and U.S. Provisional Patent Application Ser. No. 63/214,730, filed Jun. 24, 2021. The entire contents of all of which are incorporated herein by reference.

FIELD

The present invention is directed to an edge-lit back light unit for a backlit display having improved efficiency that allows for increased viewing brightness without increasing the electric power to the display.

BACKGROUND

An edge-lit back light unit (BLU) uses a light guide film 100 with a plurality of Light Emitting Diodes (LEDs) 110 typically positioned along one side of the light guide film 100, as illustrated in FIG. 1. The light guide film 100 has a width W and a length L, and the LEDs 110 are positioned at one edge along the width W of the light guide film 100 and configured to emit light into the light guide film 100 such that the light travels along the length L of the light guide film 100, as illustrated in FIG. 2, which is a cross section taken along line 2-2 in FIG. 1. The light guide film 100 typically has small structures on the top and/or bottom surfaces to cause the light to be coupled out of the light guide film 100. Ideally, the structures are apodised such that the light coupled out of the light guide film 100 has a spatially uniform intensity. Generally, the light being coupled out of the light guide film 100, couples out with an angular distribution that is directed away from the light input edge of the light guide film 100, as illustrated in FIG. 2. This general direction away from the light guide film 100 runs nominally along the length, L, of the light guide film 100 and is referred to as a light direction of the light guide film 100.

It is desirable for back light units for edge-lit displays to maximize the light efficiency, i.e., to increase the viewing brightness without having to increase the electric power provided to the back light unit.

SUMMARY

The present invention achieves an increased efficiency by replacing a conventional diffuser film in the back light unit with an improved light management diffuser film that has an angular light distribution output that is matched to the light acceptance angles of the crossed brightness enhancement films.

According to an aspect of the invention, there is provided an edge-lit back light unit for a backlit display. The edge-lit back light unit includes a specular reflector, an edge-lit light guide film positioned above the specular reflector. The edge-lit light guide film has a length and a width. A combination of the edge-lit light guide film and the specular reflector is configured to provide a peak optical distribution of 15° to 20° and a full width half maximum angle of diffusion of 25° to 45°. A diffuser film is positioned above the edge-lit light guide film. The diffuser film has a plurality of parallel prism microstructures on one side thereof facing the edge-lit light guide film and a plurality of diffuser microstructures on an opposite side thereof. Each of the plurality of parallel prism microstructures has an apex angle of 78° to 92° and a refractive index of 1.49 to 1.58. The diffuser microstructures have a full width half maximum angle of diffusion of 30° to 60°. A pair of crossed brightness enhancement films is positioned above the diffuser film. Each of the brightness enhancement films has a plurality of parallel micro prisms on one side thereof facing away from the diffuser film. The plurality of parallel micro prisms of one of the brightness enhancement films is oriented perpendicular to the plurality of micro prisms of the other brightness enhancement film. The plurality of prism microstructures of the diffuser film is substantially aligned with the plurality of parallel micro prisms that is closest to being aligned with the length of the light guide film.

In an embodiment, the diffuser microstructures of the diffuser film are circular diffuser microstructures.

In an embodiment, the diffuser microstructures of the diffuser film are conical microstructures. In an embodiment, the conical microstructures have an apex angle of about 110°.

In an embodiment, the diffuser microstructures of the diffuser film are four-sided pyramidal microstructures. In an embodiment, the four-sided pyramidal microstructures have an apex angle of about 110°. In an embodiment, faces of the four-sided pyramidal microstructures are aligned to be parallel or perpendicular to the prism microstructures of the diffuser film. In an embodiment, faces of the four-sided pyramidal microstructures are oriented about 45° relative to the prism microstructures of the diffuser film.

In an embodiment, the edge-lit back light unit also includes a plurality of LEDs positioned along the width of the light guide film.

In an embodiment, the diffuser microstructures are angle bending microstructures oriented to bend light in a direction aligned with the plurality of prism microstructures and away from the plurality of LEDs.

According to an aspect of the invention, there is provided an edge-lit back light unit for a backlit display. The edge-lit back light unit includes a diffusive reflector, and an edge-lit light guide film positioned above the diffusive reflector. The edge-lit light guide film has a length and a width. A combination of the edge-lit light guide film and the diffusive reflector is configured to provide a peak optical distribution of 30° to 50° and a full width half maximum angle of diffusion of 55° to 85°. A diffuser film is positioned above the edge-lit light guide film. The diffuser film has a plurality of parallel prism microstructures on one side thereof facing the edge-lit light guide film and a plurality of diffuser microstructures on an opposite side thereof. Each of the plurality of parallel prism microstructures has an apex angle between 75° and 85° and a refractive index between 1.59 and 1.67. The diffuser microstructures have a full width half maximum angle of diffusion of less than 20°. A pair of crossed brightness enhancement films is positioned above the diffuser film. Each of the brightness enhancement films has a plurality of parallel micro prisms on one side thereof facing away from the diffuser film. The plurality of parallel micro prisms of one of the brightness enhancement films is oriented perpendicular to the plurality of micro prisms of the other brightness enhancement film. The plurality of prism microstructures of the diffuser film is substantially aligned with the plurality of parallel micro prisms that is closest to being aligned with the length of the light guide film.

In an embodiment, the diffuser microstructures of the diffuser film are circular diffuser microstructures. In an embodiment, the diffuser microstructures have a full width half maximum angle of diffusion of less than or equal to 10°. In an embodiment, the diffuser microstructures have a full width half maximum angle of diffusion of less than or equal to 5°.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale, although at least one of the figures may be drawn to scale. Reference characters designating corresponding components are repeated as necessary throughout the figures for the sake of consistency and clarity.

DETAILED DESCRIPTION

The luminous intensity distributions of the light guide film 100 and the light guide film 100 with the diffuser film 320 may be used to understand how such films would transfer the native output of an LED 110 into light distributions that are well matched to acceptance angles of the pair of crossed brightness enhancement films 330, 340. A goniophotometer is generally used to measure those light distributions. The setup includes a mechanical goniophotometer with a horizontal and vertical axis for rotating the test sample and a photometer for measuring the luminous intensity over a given distance. The photometer is located at a much greater distance from test sample than the test sample's light emitting surface dimensions so that the measured results are not related to the size of the test sample. The process is often referred as a "far field" distribution measurement. The optical distribution data described herein were collected using a goniophotometer with the aforementioned setup.

Figure 1:
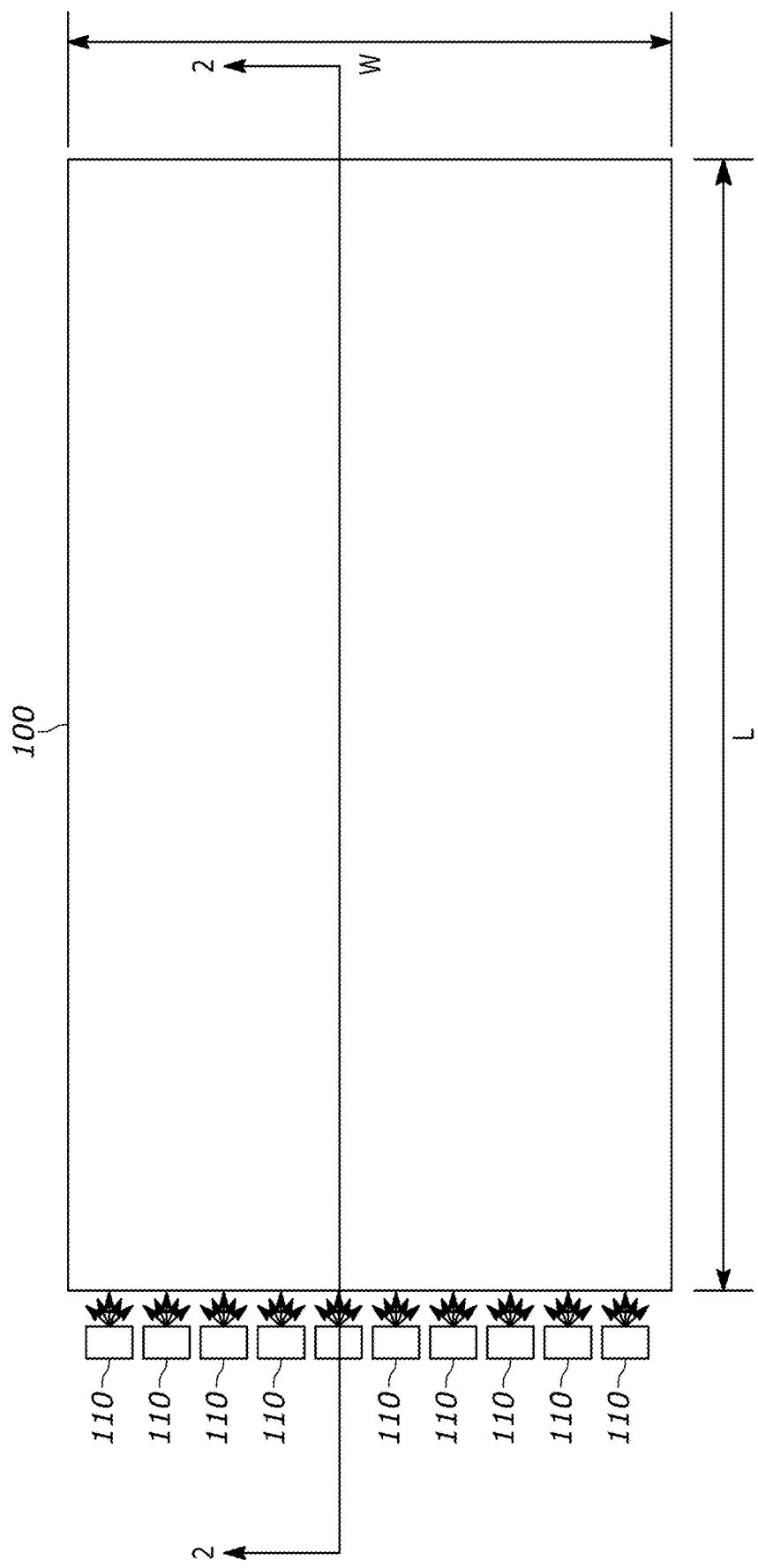
FIG. 1 is a schematic top view of an edge-lit light guide film with a plurality of Light Emitting Diode (LED) light sources for use in an edge-lit back light unit for a backlit display.
Figure 2:
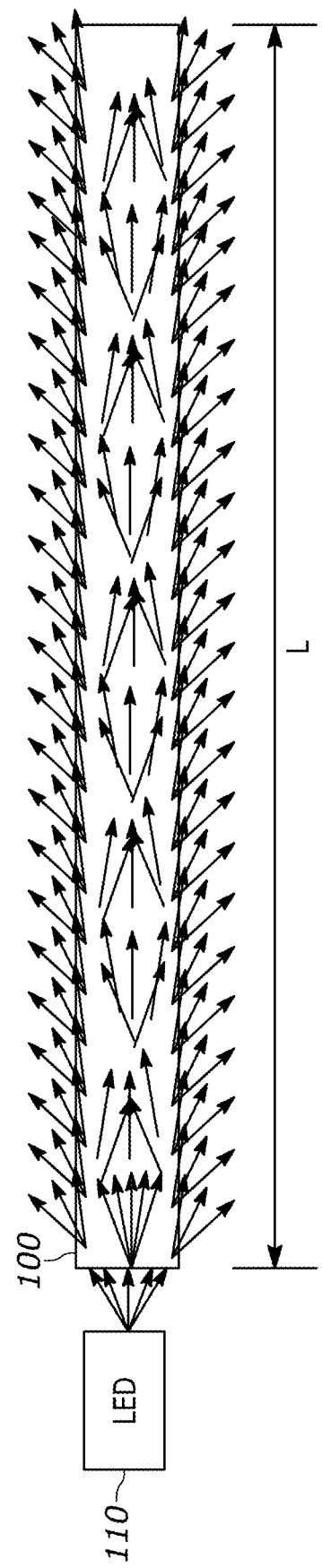
FIG. 2 is a schematic cross-sectional view of FIG. 1 taken along line 2-2.
Figure 3A:
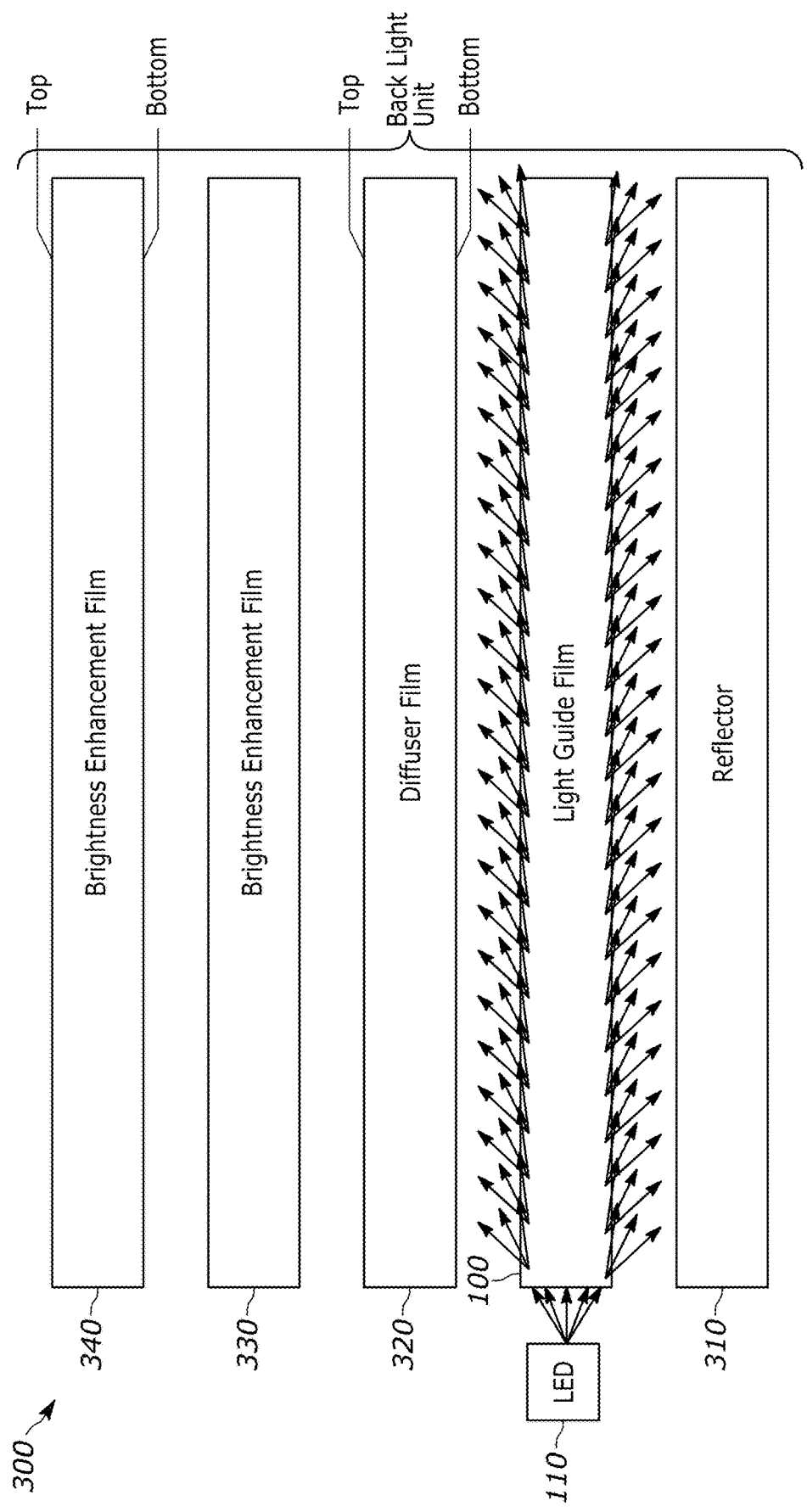
FIG. 3A is a schematic exploded cross-sectional view of a back light unit for a backlit display that includes the light guide film and LEDs of FIGS. 1 and 2.

FIG. 3A schematically illustrates the light guide film 100 of FIGS. 1 and 2 in a back light unit 300. Specifically, FIG. 3A is a schematic exploded cross-sectional view of a back light unit for a backlit display that includes the light guide film and LEDs of FIGS. 1 and 2. As illustrated, a reflector 310 is positioned underneath the light guide film 100. The reflector 310 may be specular reflector, a diffusive reflector, or a combination thereof, and is configured to reflect the light coupled out of a lower side of the light guide film 100 back towards the light guide film 100. Positioned above the light guide film 100 is a diffuser film 320, which may also be referred to as a gain enhancing film, and which is typically circularly symmetric, and is configured to improve the uniformity of the light coupled out of an upper side of the light guide film 100.

Positioned above the diffuser film 320 are two brightness enhancement films (BEFs) 330, 340. The brightness enhancement films 330, 340 in some embodiments have a plurality of parallel micro prisms with an apex angle of 90° on one side thereof, and the refractive index of the prisms is typically between 1.55 and 1.7. Within the back light unit 300, the brightness enhancement films 330, 340 are positioned to have the prisms pointed away from the light guide film 100, prisms are positioned on a top surface of the BEF, and the prisms in the top film 340 are oriented perpendicular to the lower film 330. The plurality of parallel micro prisms of one of the brightness enhancement films 330, 340 is generally aligned (i.e., to within about 20°) with the length L of the light guide film 100. The plurality of parallel micro prisms of the other of the brightness enhancement films 330, 340 are generally aligned (i.e., within about 20°) with the width W of the light guide film 100. That is, the alignment of the direction of the prism apexes is generally along a light direction of the light guide film 100. In other embodiments, the alignment of the direction of the prism apexes is closer than 20 degrees. In some embodiments, the crossed brightness enhancement films 330, 340 increase the on-axis brightness of the light exiting the back light unit 300.

It is desirable for back light units 300 for edge-lit displays to maximize the light efficiency, i.e., to increase the viewing brightness without having to increase the electric power provided to the back light unit 300. One feature of the present teaching is the recognition that an orientation of the prisms and/or an orientation of the film with respect to the direction of light, or light direction, propagating through the backlight display can be chosen to produce a high on-axis brightness for the display.

For example, in some embodiments, the orientation of prisms of at least one brightness enhancing film 330, 340 is oriented along the direction of light propagating through the light guide film. In some embodiments, it is the direction of the apex of prisms on the top brightness enhancing film 340 that is nominally (i.e. less than 10 degrees, or less than 20 degrees) along the direction of light propagating through the light guide film. In some of these embodiments, the direction of the apex of prisms on the second brightness enhancing film 330 is nominally perpendicular to the direction of the apex of prisms on the top brightness enhancing film 340. In some embodiments, the direction of the apex of prisms that are on the bottom of the diffuser film 320 are aligned with the direction of the apex of prisms on the top brightness enhancing film 340. In some embodiments, a direction of at least some of the faces of pyramids that are positioned on the top side of the diffuser film 320 is aligned in parallel with the direction of the apex of prisms that are on the bottom of the diffuser film 320. That is, an apex direction of the pyramids in the diffuser film 320 is aligned nominally parallel to the direction of the prism apexes. The term nominally parallel as used herein means the angle between the two directions is substantially zero degrees. In some embodiments, a direction of at least some of the faces of pyramids that are positioned on the top side of the diffuser film 320 is aligned at 45 degrees with the direction of the apex of prisms that are on the bottom of the diffuser film 320. These various embodiments of microstructure alignment result in a high brightness from the back light unit 300.

Figure 3B:
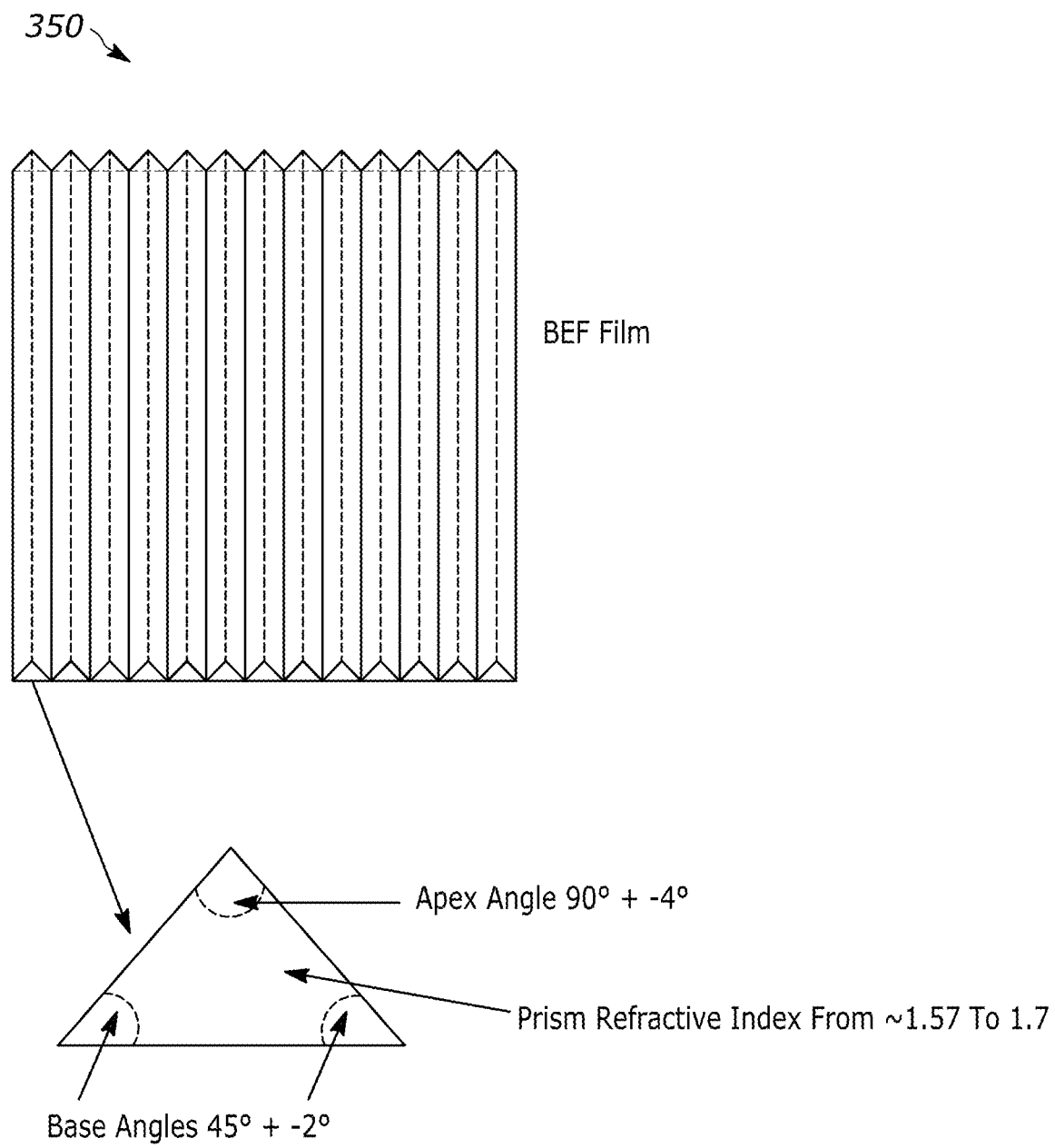
FIG. 3B is a schematic of a brightness enhancing film for a backlit display having prism microstructures and including detail of the apex angle and base angles.

FIG. 3B is a schematic of a brightness enhancing film 350 for a backlit display having prism microstructures and including detail of the apex angle and base angles of the prism face. This structure 350 could be used for one or both of brightness enhancing films 340, 330 described in connection with FIG. 3A. Multiple prisms are oriented parallel to each other along one direction of the film. The direction of a line through the apex of the prisms is called a prism apex direction. In some embodiments, the multiple prisms run along straight lines. In some embodiments, the prisms are not along perfectly straight lines, and follow a slightly wavy path. In embodiments with wavy lines of prism apexes, the prisms can still be considered nominally parallel and having a predominant prism apex alignment direction. The prisms in some embodiments are positioned on the top side of the film.

A face on view of one embodiment of the triangular prism shows an apex angle of 90°±4°. The base angles for this embodiment of a face of the prisms are 45°±2°. For example, the refractive index of the prisms can be in a range from nominally 1.57 to 1.7.

Figure 3C:
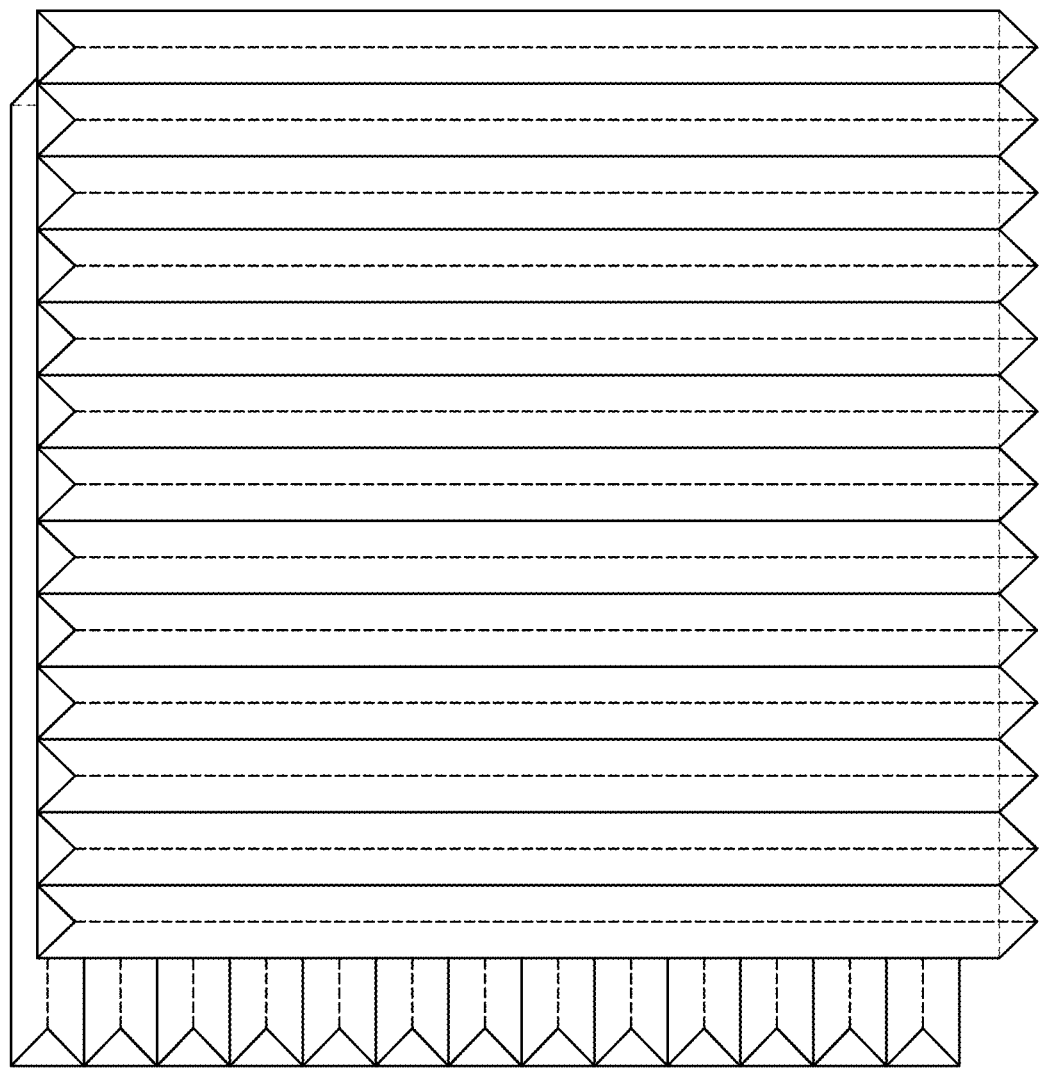
FIG. 3C is a schematic of a stacked pair of brightness enhancing films for a backlit display having prism microstructures illustrating a perpendicular orientation of the two films.

FIG. 3C is a schematic of a stacked pair of brightness enhancing films 355 for a backlit display having prism microstructures illustrating a perpendicular orientation of the two films. This stacked pair of brightness enhancing films 355 could be, for example, the two brightness enhancing films 340, 330 described in connection with FIG. 3A. These films are positioned such that the directions of the apexes of the parallel prisms in the two films are oriented perpendicular to each other. In some embodiments, the direction of the apexes of the prisms on the top film (e.g. film 340 of FIG. 3A), is oriented along the direction of light propagating through the light guide film (e.g. film 100) of FIG. 3A.

In a perpendicular orientation of the prism apex directions of stacked brightness enhancing films 355, as is clear to those skilled in the art, the direction of one of the two films will generally be aligned more along the direction of light propagating through the light guide film than the other. This is because the films are unlikely to be oriented exactly along the diagonal. As such, in general, it is possible to define a direction of the apex of the prisms in a stack that is most closely aligned with the direction of light propagating through the light guide film when there are two stacked brightness enhancing films 355. In some embodiments, this will be the top film direction, and in other embodiments, this will be the bottom film direction depending on which one is most closely aligned along the direction of light propagating through the light guide film.

Figure 3D:
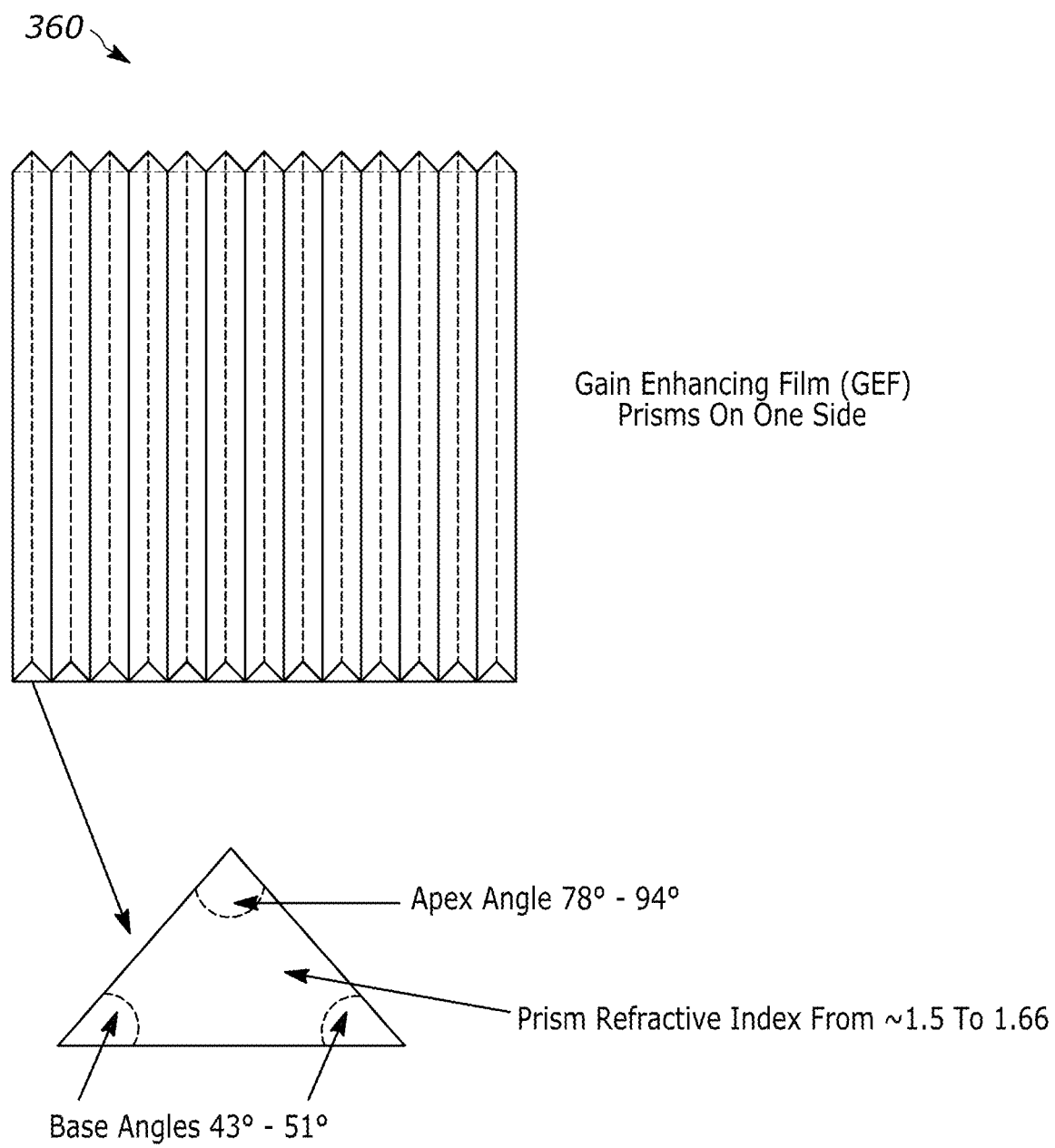
FIG. 3D is a schematic of a gain enhancing film for a backlit display having prism microstructures on one side and including detail of the apex angle and base angles.

FIG. 3D is a schematic of a gain enhancing film 360 for a backlit display having prism microstructures on one side and including detail of the apex angle and base angles of the prism face. The terms gain enhancing film and diffuser film are used interchangeably herein. The gain enhancing film 360 can be, for example, the diffuser film 320 described in connection with FIG. 3A. In some embodiments, and referring to the orientation of the back lit display of FIG. 3A, the gain enhancing film 360, 320 has prisms running along the bottom side of the film. That is, the prism microstructures are positioned on the side of the films 360, 320 that is closest to the light guide film 100. In some embodiments, the direction of the apex of the prism microstructures along the film 360, 320 is oriented to be nominally aligned along the direction of light propagating through the light guide film. In some embodiments, the alignment is to within ten degrees, and in other embodiments the alignment is to within twenty degrees.

A face on view of one embodiment of the triangular prism shows that an apex angle can be in a range from 78° to 94°. The corresponding base angles for this embodiment of a face of the prisms are 43° to 51°. The refractive index of the prisms can be in a range from nominally 1.5 to 1.66.

Figure 3E:
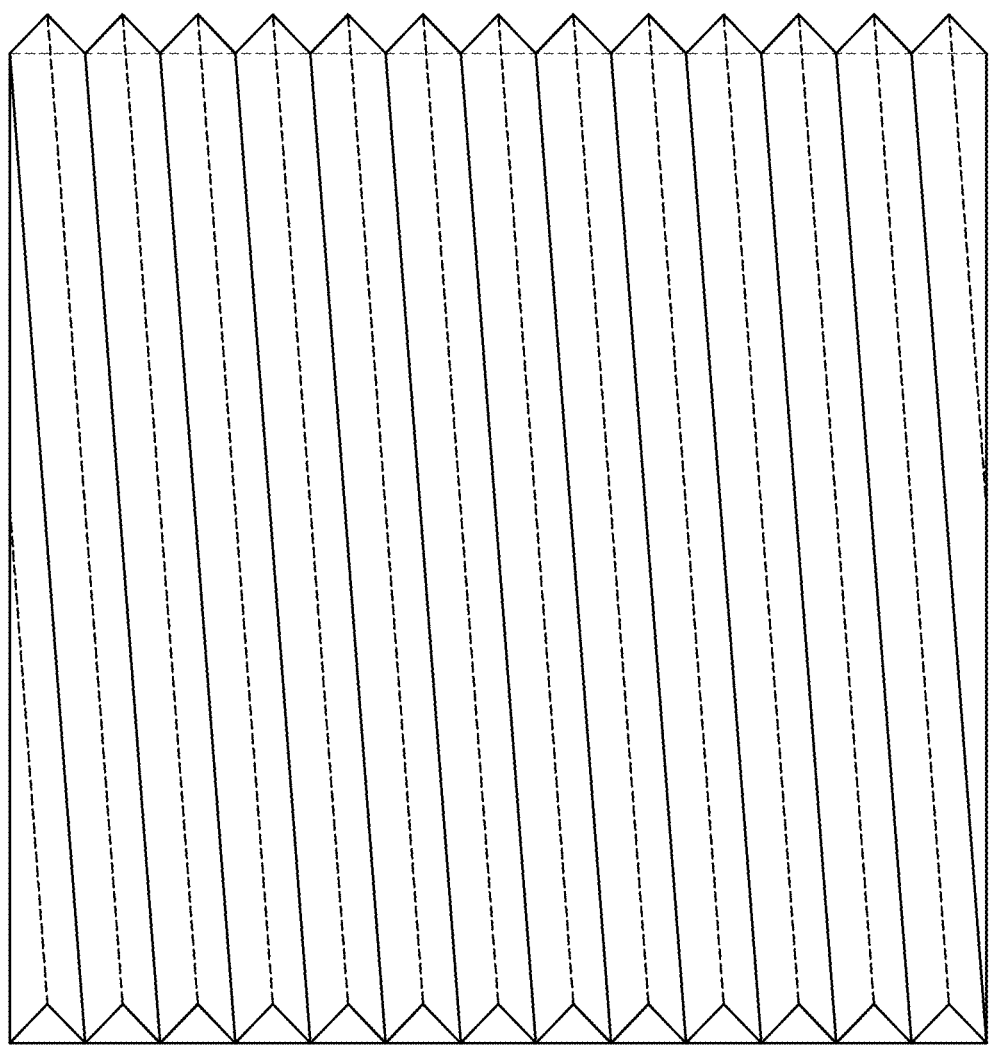
FIG. 3E is a schematic of a gain enhancing film for a backlit display having prism microstructures on one side where the prisms are formed at a desired angle with respect to the long axis of the film.

FIG. 3E is a schematic of a gain enhancing film 365 for a backlit display having prism microstructures on one side where the prisms are formed at a desired angle with respect to a long axis of the film. The angle can be arbitrary. The ability to fabricate the apexes of the parallel prisms with a direction that is different from a long axis of the film is one way to create the various relative alignments of the directions of the microstructures in various films and the light direction as described herein. That is, for example, referring to FIG. 3A, the long axis of two or more of the various films 100, 320, 330, 340, can be aligned in the stack of films that produce the back light unit 300. Then, the angle between, for example, the direction of the apex prisms of at least one brightness enhancing film 330, 340 and the direction of light propagating through the light guide film 100 is based on the angle between the direction of the apexes of the parallel prisms and the direction of the long axis of the film 330, 340.

Figure 3F:
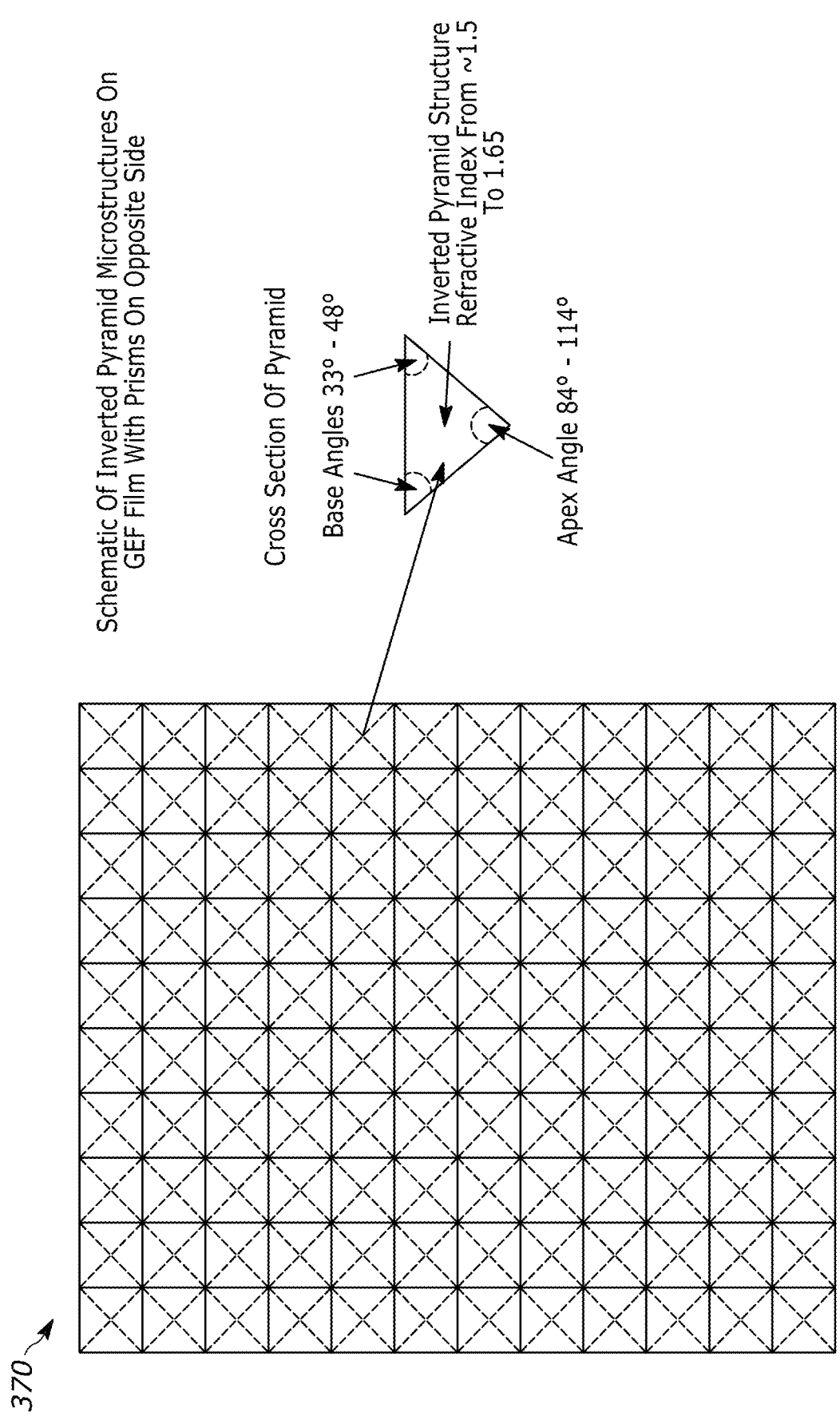
FIG. 3F is a schematic of a gain enhancing film for a backlit display having inverted pyramid microstructures on one side and prisms on the opposite side and including detail of the apex angle and base angles of the inverted pyramid structure.

FIG. 3F is a schematic of a gain enhancing film 370 for a backlit display having inverted pyramid microstructures on one side and prisms on the opposite side and including detail of the apex angle and base angles of the inverted pyramid structure. In this embodiment, a direction that passes along the apexes in a row of pyramid structures that are positioned on one side of the film, that is a direction that passes through two opposite faces of the pyramid structures, is referred to as a pyramid apex direction. The pyramid apex direction in some embodiments is aligned to be parallel to the direction of the apex of the parallel prism structures that are positioned on the other side of the film.

In some embodiments, the gain enhancing film 370 is configured as the diffuser film 320 described in connection with FIG. 3A. In some of these embodiments, the prism microstructures of the gain enhancing film 370, 320 are on the bottom of the films 370, 320 facing toward the light guide film 100 and the pyramid structures are on the top of films 370, 320. In some embodiments the pyramids are inverted and point toward the middle of the film 370, as illustrated in FIG. 3F. In other embodiments, the pyramids point up and out of the top side of the film 370.

Referring also to FIG. 3A, in some embodiments, a direction of the apex of the parallel prism structures on the bottom of the film 370, 320 are aligned with at least one of the directions of the apex of the parallel prism structures on the top brightness enhancing films 330, 340. In some embodiments, this alignment is with the films 330, 340 having a direction of the apex of the parallel prism structures that is most closely aligned with a direction of light propagating through the light guide film 100. In other embodiments, this film with a direction of the apex of the parallel prism structures that is most closely aligned with a direction of light propagating through the light guide film 100 is the top film 340.

A face on view of one embodiment of the pyramid cross-section of the film 370 shows that an apex angle can be in a range from 84° to 114°. The corresponding base angles for this embodiment of a face of the prisms are 33° to 48°. For example, the refractive index of the prisms can be in a range from nominally 1.5 to 1.65.

One feature of the gain enhancing films, which is also referred to a diffusion films, of the present teaching is that embodiments having pyramid microstructures on one side of the film and prism structures on the opposite side of the film can utilize various angles between a direction that passes along the apexes in a row of pyramid structures and a direction that passes along the apexes in a row of prism structures. For example, in various embodiments, these directions can be parallel, or the same, as described in connection with FIG. 3F. These directions can also be at a 45-degree angle. The prism structures can be configured with various angles between these directions to achieve various performance metrics.

Figure 3G:
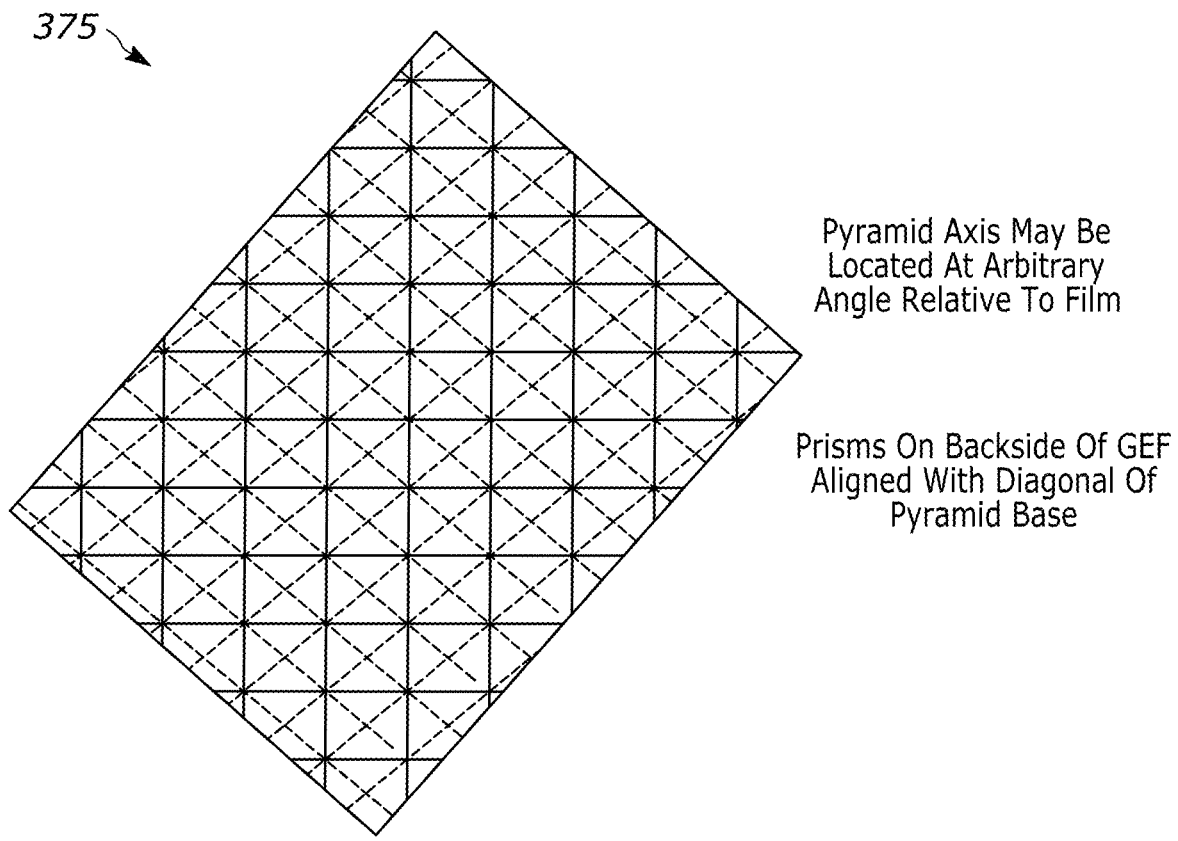
FIG. 3G is a schematic of a gain enhancing film for a backlit display having inverted pyramid microstructures on one side and prisms on the opposite side where the pyramid axis is formed at a desired angle with respect to the long axis of the film and the prisms on the opposite side are aligned with a diagonal of a base of the pyramid.

FIG. 3G is a schematic of a gain enhancing film 375 for a backlit display having inverted pyramid microstructures on one side and prisms on the opposite side where the pyramid axis is formed at a desired angle with respect to the long axis of the film and the prisms on the opposite side are aligned with a diagonal of a base of the pyramid. In some embodiments, either of the directions can also be at an arbitrary angle with respect to the long side of the film.

Figure 3H:
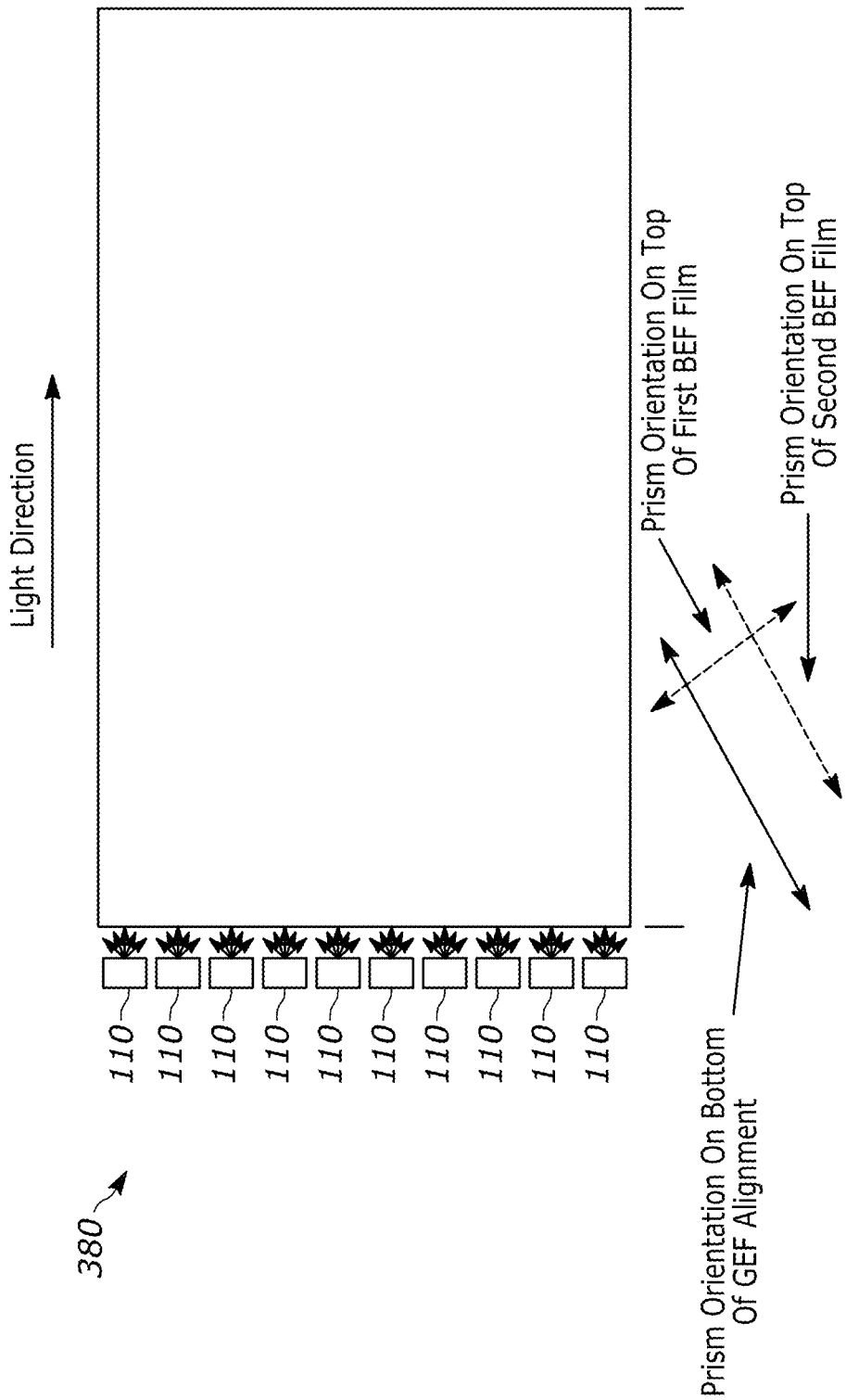
FIG. 3H is a schematic top view of an edge-lit light guide film with a plurality of Light Emitting Diode (LED) light sources showing the orientation of light direction and a desired orientation of the prisms on the top of a first brightness enhancing film, a desired orientation of the prisms on the top of a second brightness enhancing film and a desired orientation of the prisms on the bottom of a gain enhancing film.

FIG. 3H is a schematic top view of an edge-lit light guide film 380 with a plurality of Light Emitting Diode (LED) light sources 110 showing the orientation of light direction and a desired orientation of the prisms on the top of a first brightness enhancing film, and also showing a desired orientation of the prisms on the top of a second brightness enhancing film and a desired orientation of the prisms on the bottom of a gain enhancing film. For example, the light guide film 380 can be the light guide film 100 described in connection with FIG. 3A. An example configuration of directions described herein for microstructures on other films (not shown in FIG. 3H) is shown. Referring also to FIG. 3A, in this embodiment, the direction of the prism apex on the top BEF film 340 is perpendicular to the direction of the prism apex on the bottom BEF film 330. As such, the direction of the prism apex on the top BEF film 340 is most closely aligned with the light direction in the light guide film 380. In this embodiment, the direction of the apex of prisms on a bottom side of the diffuser film 320 is aligned in the same direction as the direction of the prism apex on the top BEF film 340. In some embodiments, these directions are not along the long side of the respective film.

While the description of the various embodiments associated with FIGS. 3A-H are focused on prism and/or pyramid microstructures, as is clear to those skilled in the art, the present teaching is not limited to these shapes. For example, cone shapes and/or angle bending shapes can also be used in various embodiments according to the present teaching.

Figure 4:
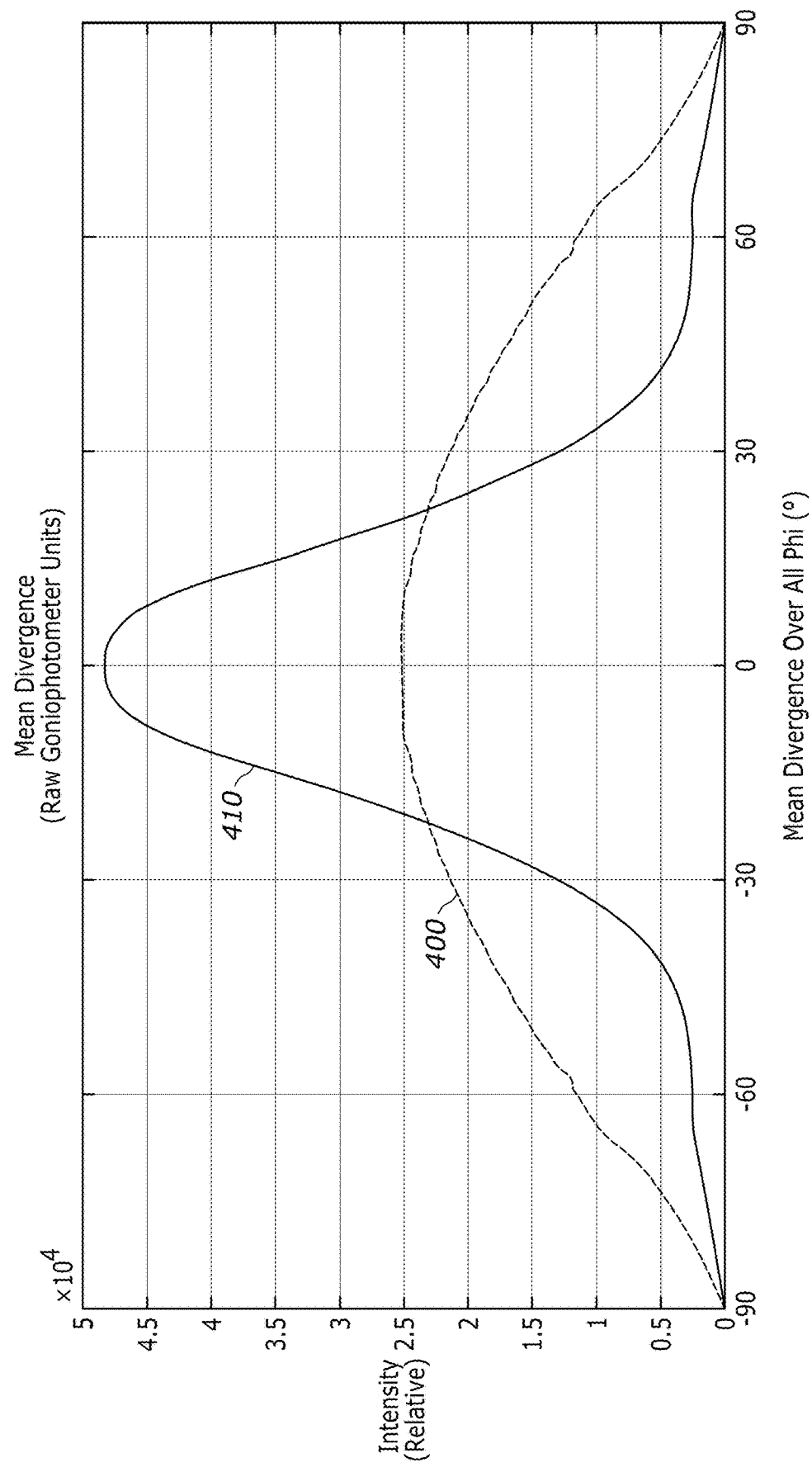
FIG. 4 is a two-dimensional plot of a distribution of light output from an LED as a function of angle, as measured by a goniophotometer, and a two-dimensional plot of the distribution of light output from the LED as a function of angle, as measured by the goniophotometer, after the light has passed through a pair of crossed brightness enhancement films.
Figure 5A:
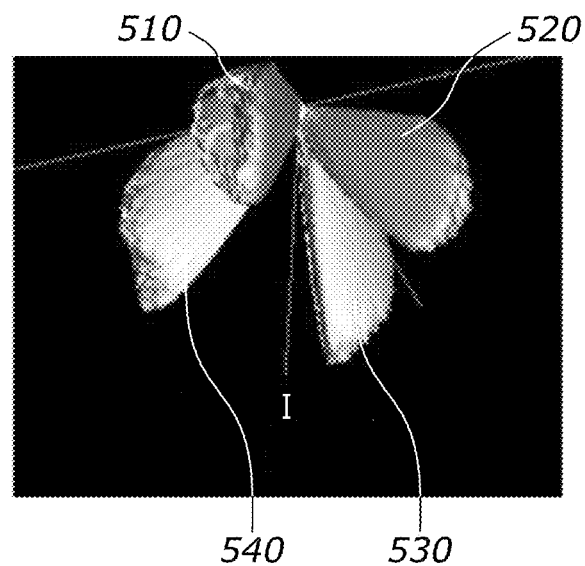
FIG. 5A is a three-dimensional representation of defined angles from which light approaching the pair of crossed brightness enhancement films can transmit through the pair of crossed brightness enhancement films.
Figure 5B:
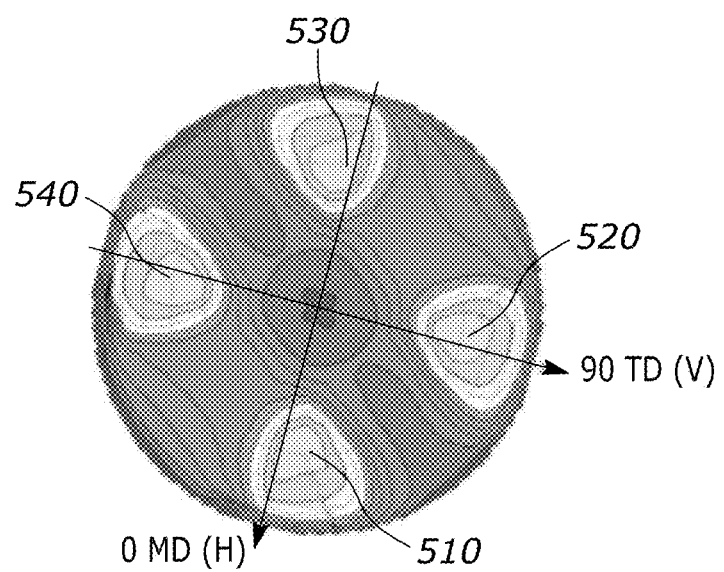
FIG. 5B is a two-dimensional representation of FIG. 5A.
Figure 6:
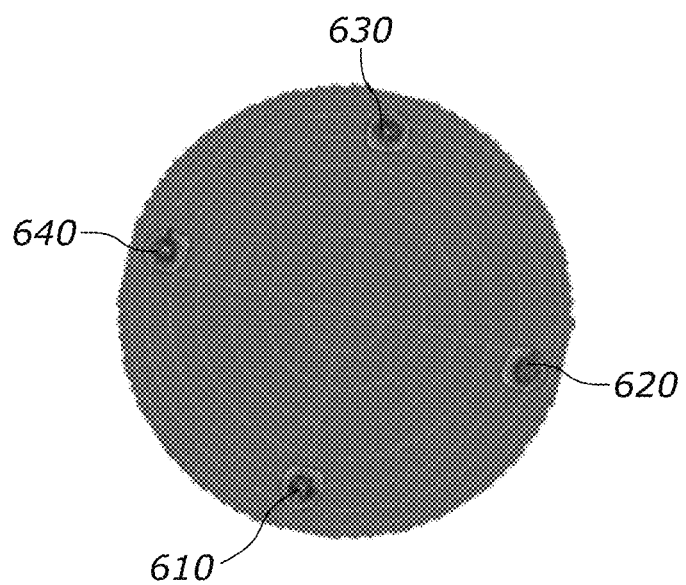
FIG. 6 is a two-dimensional representation of FIG. 5A of defined angles from which light approaching the pair of crossed brightness enhancement films can transmit through the pair of crossed brightness enhancement films on axis and normal to a top surface of the light guide film.

FIG. 4 shows how a Lambertian distribution 400, which is emitted from an LED 110, is transformed into a narrower distribution 410 with an increased on-axis brightness by the pair of crossed brightness enhancement films 330, 340. FIG. 5A illustrates how the crossed brightness enhancement film 330, 340 work and is a three-dimensional representation of defined angles from which light approaching the pair of crossed brightness enhancement films 330, 340 can transmit through the pair of brightness enhancement films 330, 340. Only light approaching the crossed brightness enhancement films 330, 340 from the defined angles, represented by four lobes 510, 520, 530 and 540, can transmit through the crossed brightness enhancement films 330, 340 and exit on-axis with the narrow distribution 410 of FIG. 4, and most other light is reflected back down toward the light guide film 100. Some of the light that is reflected back down toward the light guide film 100 is lost due to absorption of the diffuser film 320, the light guide film 100, and the reflector 310. The light that is reflected down and recirculates back up towards the pair of crossed brightness enhancement films 330, 340 may exit the crossed brightness enhancement films 330, 340 on a second or third attempt. FIG. 5B is a two-dimensional representation FIG. 5A. FIG. 6 illustrates the light acceptance locations 610, 620, 630, 640 where the light exits the pair of crossed brightness enhancement films 330, 340 on-axis.

Figure 7:
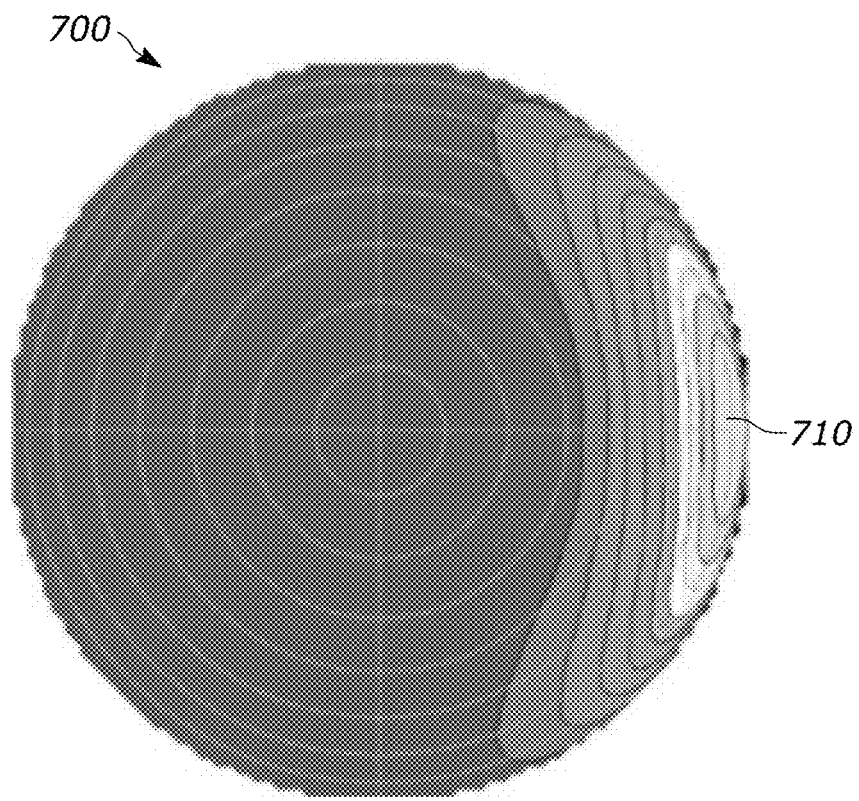
FIG. 7 is a two-dimensional plot of a distribution of light output from a top surface of an edge-lit light guide film having a narrow distribution with a specular reflector positioned at a bottom surface of the edge-lit light guide film, as measured by a goniophotometer.
Figure 8:
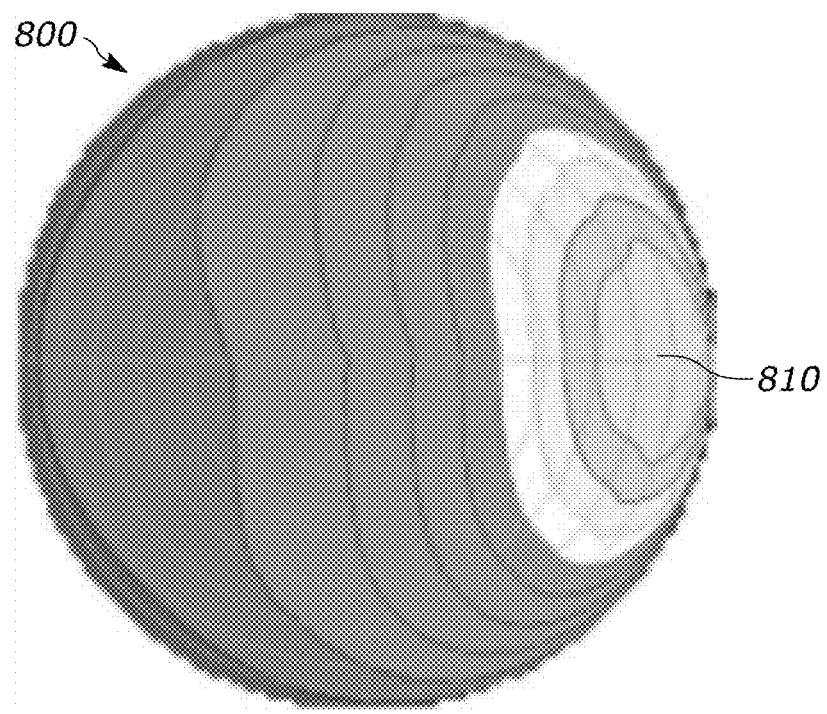
FIG. 8 is a two-dimensional plot of a distribution of light output from a top surface of an edge-lit light guide film having a wide distribution with a diffusive reflector positioned at a bottom surface of the edge-lit light guide film, as measured by a goniophotometer.

Different light guide films 100 and reflectors 310 can have very different angular output distributions, and the characteristics of both the light guide film 100 and the reflector 310 define the output distribution of the combination of the two. FIGS. 7 and 8 illustrate measured angular output distributions for two different combinations of light guide films 100 and reflectors 310. FIG. 7 illustrates a measured angular output distribution 700 of a combination of a light guide film 100 having a narrow distribution output and a specular reflector 310 positioned beneath the light guide film 100, with area 710 representing the highest intensity of light. The combination of the light guide film 100 having the narrow distribution output and the specular reflector 310 is configured to provide a peak optical distribution of 15° to 20° and a full width half maximum (FWHM) angle of diffusion of 25° to 45° FIG. 8 illustrates a measured angular output distribution 800 of a combination of a light guide film 100 of the embodiment of the back light unit 300 described in connection with FIG. 3A having a wide distribution output and using a more diffuse (diffusive) reflector 310, as compared to a more specular reflector 310, positioned beneath the light guide film 100. The area 810 represents the highest intensity of light. The combination of the light guide film 100 having the wide distribution output and the diffusive reflector 310 is configured to provide a peak optical distribution of 30° to 50° and a full width half maximum (FWHM) angle of diffusion of 55° to 85°.

Figure 9:
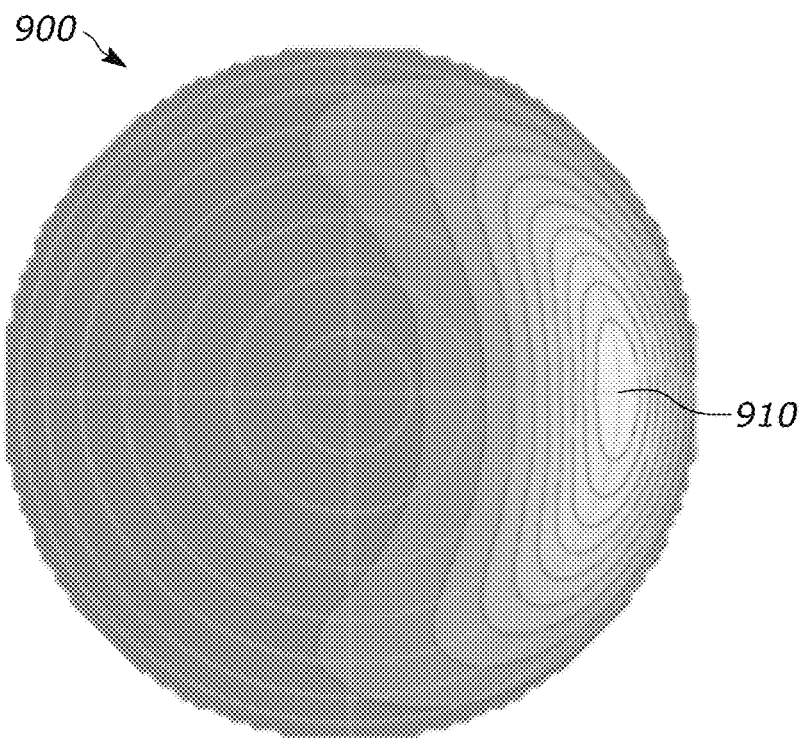
FIG. 9 is a two-dimensional plot of a distribution of light output from a top surface of a circular diffuser positioned at the top surface of the edge-lit light guide film having the narrow distribution with the specular reflector positioned at a bottom surface of the edge-lit light guide film, as measured by a goniophotometer.
Figure 10:
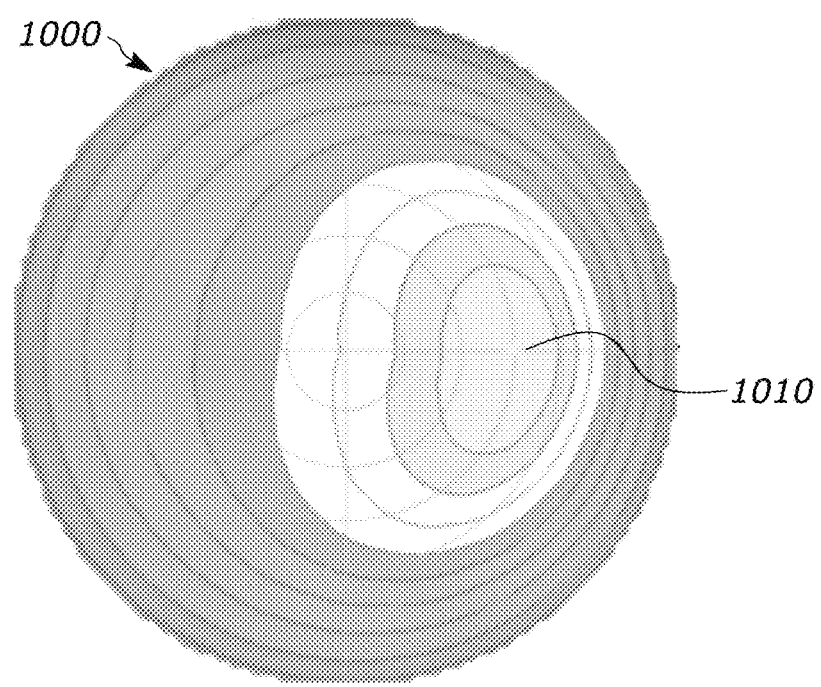
FIG. 10 is a two-dimensional plot of a distribution of light output from a top surface of a circular diffuser positioned at the top surface of the edge-lit light guide film having the wide distribution with the diffusive reflector positioned at a bottom surface of the edge-lit light guide film, as measured by a goniophotometer.

The addition of the diffuser film 320 further modifies the angular light output distribution. FIGS. 9 and 10 illustrate how a circular diffuser film modifies the optical distribution for each combination of light guide film 100 and reflector 310 represented by FIGS. 7 and 8, respectively. FIG. 9 illustrates a measured angular output distribution 900 of the combination of the circular diffuser on top of the light guide film 100 having the narrow distribution output with the specular reflector 310 positioned beneath the light guide film 100, with area 910 representing the highest intensity of light. FIG. 10 illustrates a measured angular output distribution 1000 of the combination of the circular diffuser on top of the light guide film 100 having the wide distribution output with the diffusive reflector 310 positioned beneath the light guide film 100, with area 1010 representing the highest intensity of light. It was found that with or without the circular diffuser, the optical distribution of either light guide film 100 with its respective reflector 310 is often not well matched to the input distribution required by the pair of crossed brightness enhancement films 330, 340 to exit the back light unit 300 on-axis, as discussed above with respect to FIGS. 5A, 5B and 6.

It is desirable for the optical output distribution of the diffuser film 320/light guide film 100/reflector 310 combination to match the acceptance criteria of the pair of crossed brightness enhancement films 330, 340 for on-axis transmission as much as possible so that the on-axis brightness exiting the back light unit 300 may be maximized, particularly in view of the fact that some portion of the light that is reflected and recirculated within the back light unit 300 will be lost by absorption and by the less than 100% reflectivity of the reflector 310. As described in further detail below, the relative on-axis brightness of each combination of light guide film 100 and reflector 310, and pair of crossed brightness enhancement films 330, 340 described above was measured with a variety of different embodiments of diffuser films 320.

Back Light Unit with Light Guide Film Having Narrow Distribution and Specular Reflector Comparative Example A: The on-axis brightness of the light guide film 100 having the narrow distribution output with the specular reflector 310 described above, a 50° full width half maximum (FWHM) circular volumetric diffuser 320 typically used with such a light guide film 100 and reflector 310, and a pair of crossed brightness enhancement films 330, 340 was measured as a base-line and set to 100.0% for comparison purposes.

A series of diffuser films 320 with circular microstructure diffusers having full width half maximum (FWHM) angles of diffusion ranging from 20° to 90° were each substituted for the circular volumetric diffuser film 320 used for Comparative Example A in the back light unit 300, and the on-axis brightness of the back light unit 300 was measured relative to Comparative Example A. Specifically, Example 1 included a diffuser film 320 with 20° FWHM circular diffuser microstructures, Example 2 included a diffuser film 320 with 40° FWHM circular diffuser microstructures, Example 3 included a diffuser film 320 with 55° FWHM circular diffuser microstructures, Example 4 included a diffuser film 320 with 80° FWHM circular diffuser microstructures, and Example 5 included a diffuser film 320 with 90° FWHM circular diffuser microstructures. The results of the on-axis brightness testing relative to Comparative Example A are listed in Table I below.

TABLE I

Relative On-Axis Brightness Using Diffuser Films with Circular Diffuser Microstructures in Back Light Unit

| Example | Diffuser Film Description | Light Guide Film Distribution | Reflector Type | Relative On-Axis Brightness |
|---|---|---|---|---|
| Comparative Example A | 50° FWHM circular volumetric diffuser | Narrow | Specular | 100.0% |
| Example 1 | 20° FWHM circular diffuser microstructures | Narrow | Specular | 101.0% |
| Example 2 | 40° FWHM circular diffuser microstructures | Narrow | Specular | 101.0% |
| Example 3 | 55° FWHM circular diffuser microstructures | Narrow | Specular | 101.0% |
| Example 4 | 80° FWHM circular diffuser microstructures | Narrow | Specular | 100.0% |
| Example 5 | 90° FWHM circular diffuser microstructures | Narrow | Specular | 99.0% |

The results in Table I indicate that the diffuser films 320 with circular diffuser microstructures used in Examples 1-5 provide very similar on-axis brightness as the circular volumetric diffuser film used in Comparative Example A.

Next, three diffuser films 320, each with a plurality of parallel prism microstructures on one side of the diffuser film 320 pointed towards the light guide film 100 and aligned in the same direction with the micro prisms of the brightness enhancement film 330, 340 that are closest to being aligned along the length L of the light guide film 100 were tested in the back light unit 300. The opposite sides of the diffuser films 320 that faced the brightness enhancement films 330, 340 were smooth. Example 6 included a diffuser film 320 with the plurality of parallel prism microstructures each having a 90° apex angle and a refractive index of 1.5. Example 7 included a diffuser film 320 with the plurality of prism microstructures each having a 90° apex angle and a refractive index of 1.57. Example 8 included a diffuser film 320 with the plurality of prism microstructures each having a 90° apex angle and a refractive index of 1.7. The results of the on-axis brightness testing of Examples 6-8 relative to Comparative Example A are listed in Table II below.

TABLE II

Relative On-Axis Brightness Using Diffuser Films with 90° Apex Prisms on One Side in Back Light Unit

| Example | Diffuser Film Description | Light Guide Film Distribution | Reflector Type | Relative On-Axis Brightness |
|---|---|---|---|---|
| Comparative Example A | 50° FWHM circular volumetric diffuser | Narrow | Specular | 100.0% |
| Example 6 | 1.5 index 90° prism/smooth diffuser | Narrow | Specular | 81% |
| Example 7 | 1.57 index 90° prism/smooth diffuser | Narrow | Specular | 82% |
| Example 8 | 1.7 index 90° prism/smooth diffuser | Narrow | Specular | 94% |

The results indicate that none of the diffuser films 320 with the 90° prisms on one side used in Examples 6-8 performed as well as the circular volumetric diffuser film used in Comparative Example A or the diffuser films 320 with various circular diffuser microstructures described above and used in Examples 1-5 listed in Table I.

Next, circular diffuser microstructures were added to the smooth side of the diffuser film 320 used in Example 8 at various full width have maximum (FWHM) angles of diffusion. Example 9 included a diffuser film 320 with the plurality of prism microstructures each having a 90° apex angle and a refractive index of 1.7 on one side facing the light guide film 100, and a plurality of circular diffuser microstructures having a 20° FWHM on an opposite side. Example 10 included a diffuser film 320 with the plurality of prism microstructures each having a 90° apex angle and a refractive index of 1.7 on one side facing the light guide film 100, and a plurality of circular diffuser microstructures having a 30° FWHM on an opposite side. Example 11 included a diffuser film 320 with the plurality of prism microstructures each having a 90° apex angle and a refractive index of 1.7 on one side facing the light guide film, and a plurality of circular diffuser microstructures having a 40° FWHM on an opposite side. The results of the on-axis brightness testing of Examples 8-11 relative to Comparative Example A are listed in Table III below.

TABLE III

Relative On-Axis Brightness Using Diffuser Films with 1.7 Index 90° Apex Prisms on One Side and Circular Diffusers on Opposite Side in Back Light Unit

| Example | Diffuser Film Description | Light Guide Film Distribution | Reflector Type | Relative On-Axis Brightness |
|---|---|---|---|---|
| Comparative Example A | 50° FWHM circular volumetric diffuser | Narrow | Specular | 100.0% |
| Example 8 | 1.7 index 90° prism/smooth diffuser | Narrow | Specular | 93.0% |
| Example 9 | 1.7 index 90° prism/20° FWHM circular diffuser | Narrow | Specular | 102.0% |
| Example 10 | 1.7 index 90° prism/30° FWHM circular diffuser | Narrow | Specular | 105.0% |
| Example 11 | 1.7 index 90° prism/40° FWHM circular diffuser | Narrow | Specular | 107.0% |

The results indicate that adding circular diffuser microstructures on the opposite side of the diffuser film 320 having the plurality of prism microstructures each having a 90° apex angle and a refractive index of 1.7 on one side improves the performance of the diffuser film 320 in the back light unit 300 significantly.

Next, circular diffuser microstructures with various full width have maximum (FWHM) angles of diffusion were added to the smooth side of the diffuser films used in Examples 6 and 7. Specifically, Example 12 included a diffuser film 320 with the plurality of prism microstructures each having a 90° apex angle and a refractive index of 1.5 on one side facing the light guide film 100, and a plurality of circular diffuser microstructures having a 20° FWHM on an opposite side. Example 13 included a diffuser film 320 with the plurality of prism microstructures each having a 90° apex angle and a refractive index of 1.5 on one side facing the light guide film 100, and a plurality of circular diffuser microstructures having a 30° FWHM on an opposite side. Example 14 included a diffuser film 320 with the plurality of prism microstructures each having a 90° apex angle and a refractive index of 1.5 on one side facing the light guide film 100, and a plurality of circular diffuser microstructures having a 40° FWHM on an opposite side. Example 15 included a diffuser film 320 with the plurality of prism microstructures each having a 90° apex angle and a refractive index of 1.5 on one side facing the light guide film 100, and a plurality of circular diffuser microstructures having a 55° FWHM on an opposite side. Example 16 included a diffuser film 320 with the plurality of prism microstructures each having a 90° apex angle and a refractive index of 1.57 on one side facing the light guide film 100, and a plurality of circular diffuser microstructures having a 40° FWHM on an opposite side. Example 17 included a diffuser film 320 with the plurality of prism microstructures each having a 90° apex angle and a refractive index of 1.57 on one side facing the light guide film, and a plurality of circular diffuser microstructures having a 55° FWHM on an opposite side. The results of the on-axis brightness testing of Examples 12-17 relative to Comparative Example A are listed in Table IV below.

TABLE IV

Relative On-Axis Brightness Using Diffuser Films with 1.50 or 1.57 Index 90° Apex Prisms on One Side and Circular Diffuser Microstructures on Opposite Side in Back Light Unit

| Example | Diffuser Film Description | Light Guide Film Distribution | Reflector Type | Relative On-Axis Brightness |
|---|---|---|---|---|
| Comparative Example A | 50° FWHM circular volumetric diffuser | Narrow | Specular | 100.0% |
| Example 6 | 1.50 index 90° prism/smooth diffuser | Narrow | Specular | 80% |
| Example 12 | 1.50 index 90° prism/20° FWHM circular diffuser | Narrow | Specular | 105% |
| Example 13 | 1.50 index 90° prism/30° FWHM circular diffuser | Narrow | Specular | 110% |
| Example 14 | 1.50 index 90° prism/40° FWHM circular diffuser | Narrow | Specular | 113% |
| Example 15 | 1.50 index 90° prism/55° FWHM circular diffuser | Narrow | Specular | 112% |
| Example 7 | 1.57 index 90° prism/smooth diffuser | Narrow | Specular | 82% |
| Example 16 | 1.57 index 90° prism/40° FWHM circular diffuser | Narrow | Specular | 110% |
| Example 17 | 1.57 index 90° prism/55° FWHM circular diffuser | Narrow | Specular | 109% |

Surprisingly, it was found that adding the circular diffuser microstructures on the opposite side of the diffuser film 320 with the plurality of prism microstructures each having a 90° apex angle and a refractive index of 1.5 on one side had an even larger increase in the relative on-axis brightness than adding the circular microstructure diffusers to the opposite side of the diffuser film 320 having the plurality of prism microstructures each having a 90° apex angle and a refractive index of 1.7 on one side, even though the diffuser film 320 with the plurality of prism microstructures each having a 90° apex angle and a refractive index of 1.5 on one side and a smooth opposite side (Example 6) performed worse than the diffuser film 320 with the plurality of prism microstructures each having a 90° apex angle and a refractive index of 1.7 on one side and a smooth opposite side (Example 8). It was also found that the diffuser films 320 with the plurality of prism microstructures each having a 90° apex angle and a refractive index of 1.57 on one side, and a plurality of circular diffuser microstructures having either a 40° FWHM or a 55° FWHM on an opposite side (Examples 16 and 17, respectively) had slightly lower brightness than the corresponding diffuser films 320 with the prism microstructures having a refractive index of 1.5 (Examples 14 and 15, respectively).

Figure 11:
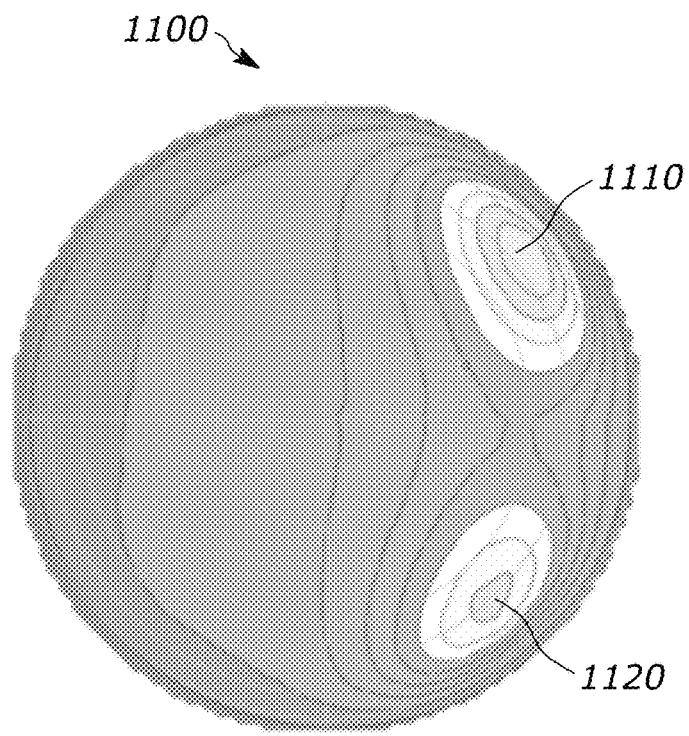
FIG. 11 is a two-dimensional plot of a distribution of light output from a top surface of a diffuser positioned at the top surface of an edge-lit light guide film having the narrow distribution with the specular reflector positioned at a bottom surface of the edge-lit light guide film, as measured by a goniophotometer, in accordance with an embodiment of the invention.
Figure 12:
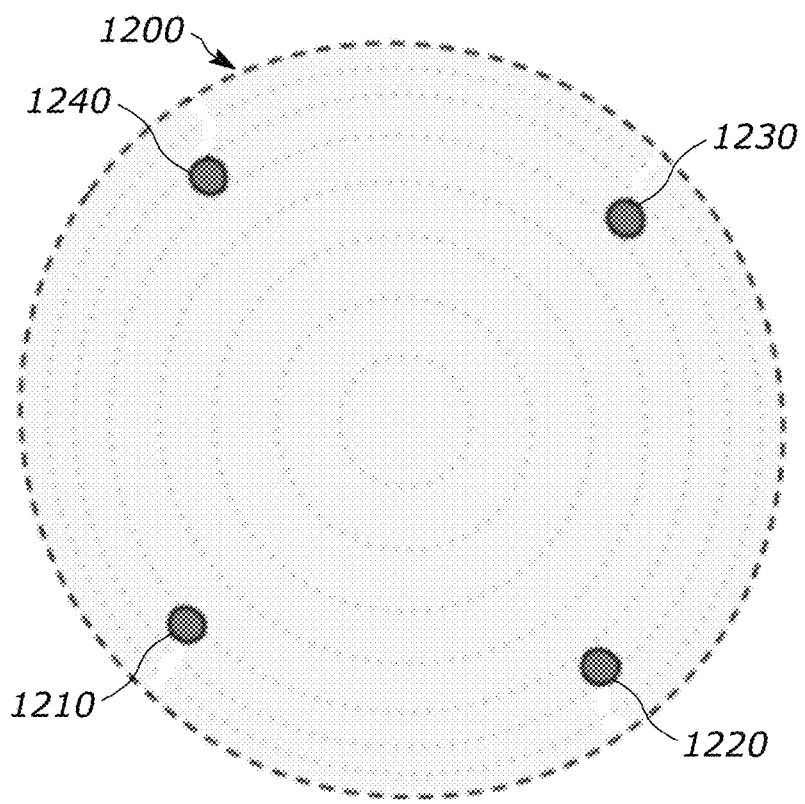
FIG. 12 is a schematic two-dimensional representation of the defined angles from which light approaching the pair of crossed brightness enhancement films can transmit through the pair of crossed brightness enhancement films on axis and normal to a top surface of the edge-lit light guide film.
Figure 13:
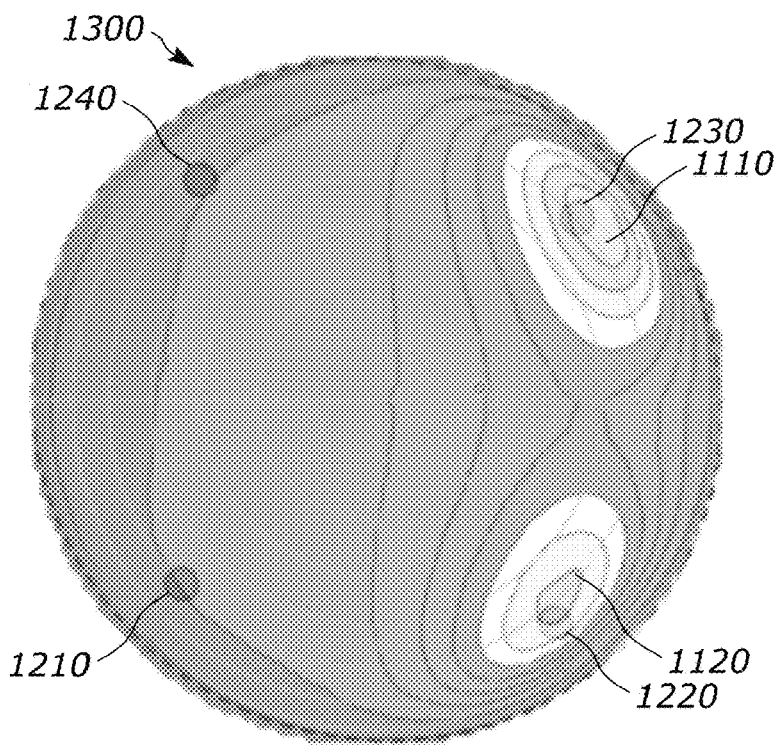
FIG. 13 is a combination of FIG. 11 and FIG. 12.

To illustrate how the diffuser film 320 of one embodiment of the invention, specifically the diffuser film 320 used in Example 15 with the plurality of prism microstructures each having an 90° apex angle and a refractive index of 1.5 on one side and 55° FWHM circular diffuser microstructures on the opposite side, performs in the back light unit 300, the angular light distribution of the combination of the Example 15 diffuser film 320 with the light guide film 100 having the narrow distribution and the specular reflector 310 was measured and compared with the acceptance angle criteria for the crossed brightness enhancement films 330, 340. FIG. 11 illustrates the measured angular light distribution 1100 of the combination of this diffuser film 320 of Example 15 with the light guide film 100 having the narrow distribution and the specular reflector 310, with areas 1110 and 1120 in FIG. 11 indicating highest intensity of light passing through. FIG. 12 illustrates the acceptance angle criteria 1200 of the crossed brightness enhancement films 330, 340, with areas 1210, 1220, 1230, 1240 indicating the locations where light will pass through the crossed brightness enhancement films 330, 340 on-axis. The combination of FIGS. 11 and 12 is represented by 1300 in FIG. 13 and indicates an excellent match between the areas 1110, 1120 of the highest intensity of light output by the diffuser film 320 with the plurality of prism microstructures each having a 90° apex and 1.5 refractive index on one side and 55° FWHM circular diffuser microstructures on the opposite side, light guide film 100 having the narrow distribution and the specular reflector 320, and the input criteria, represented by areas 1210, 1220, 1230, 1240, of the crossed brightness enhancement films 330, 340 of the back light unit 300.

Next, the effect of the apex angle of the plurality of prisms microstructures on the diffuser film was investigated. Example 18 included a diffuser film 320 with the plurality of prism microstructures each having an 80° apex angle and a refractive index of 1.5 on one side facing the light guide film 100, and a plurality of circular diffuser microstructures having a 20° FWHM on an opposite side. Example 19 included a diffuser film 320 with the plurality of prism microstructures each having an 80° apex angle and a refractive index of 1.5 on one side facing the light guide film 100, and a plurality of circular diffuser microstructures having a 30° FWHM on an opposite side. Example 20 included a diffuser film 320 with the plurality of prism microstructures each having an 80° apex angle and a refractive index of 1.5 on one side facing the light guide film 100, and a plurality of circular diffuser microstructures having a 40° FWHM on an opposite side. The results of the on-axis brightness testing of Examples 18-20 relative to Comparative Example A are listed in Table V below.

TABLE V

Relative On-Axis Brightness Using Diffuser Films Having
1.50 Index 80° Apex Prisms on One Side and Circular
Diffuser Microstructures on Opposite Side in Back Light Unit

| Example | Diffuser Film Description | Light Guide Film Distribution | Reflector Type | Relative On-Axis Brightness |
|---|---|---|---|---|
| Comparative Example A | 50° FWHM circular volumetric diffuser | Narrow | Specular | 100.0% |
| Example 18 | 1.50 index 80° prism/20° FWHM circular diffuser | Narrow | Specular | 108.0% |
| Example 19 | 1.50 index 80° prism/40° FWHM circular diffuser | Narrow | Specular | 112.0% |
| Example 20 | 1.50 index 80° prism/55° FWHM circular diffuser | Narrow | Specular | 112.0% |

The results indicate that relative on-axis brightness performance of the diffuser films 320 with the plurality of prism microstructures each having an 80° apex angle and a refractive index of 1.5 on one side and circular diffuser microstructures on the opposite side (Examples 18-20) a is very similar to the diffuser films 320 with the plurality of prism microstructures each having an 90° apex angle and a refractive index of 1.5 on one side and circular diffuser microstructures on the opposite side (Examples 12-14).

Next, conical microstructures and four-sided pyramidal microstructures in place of the circular diffuser microstructures were investigated. A conical microstructure spreads a collimated beam of light into a circular ring. Conical structures with an apex angle of 110° spread the light in a ring with a FWHM of about 40°. Inverted four-sided pyramidal microstructures also with an apex angle of about 110° were also studied. The four-sided pyramidal microstructures were aligned in two orientations: either such that the faces of the pyramidal microstructures were parallel (and perpendicular) with the prisms on the opposite side or 45° relative to the prisms on the opposite side. Example 21 included a diffuser film 320 with the plurality of prism microstructures each having a 90° apex angle and a refractive index of 1.5 on one side facing the light guide film 100, and a plurality of conical microstructures having a 110° on the opposite side. Example 22 included a diffuser film 320 with the plurality of prism microstructures each having a 90° apex angle and a refractive index of 1.57 on one side facing the light guide film 100, and the plurality of conical microstructures having a 110° apex angle on the opposite side. Example 23 included a diffuser film 320 with the plurality of prism microstructures each having a 90° apex angle and a refractive index of 1.5 on one side facing the light guide film 100, and a plurality of four-sided pyramidal microstructures having a 110° apex angle and having faces oriented parallel (and perpendicular) to the plurality of prism microstructures. Example 24 included a diffuser film 320 with the plurality of prism microstructures each having a 90° apex angle and a refractive index of 1.5 on one side facing the light guide film 100, and a plurality of four-sided pyramidal microstructures (1.5 refractive index) having a 110° apex angle and having faces oriented 45° relative to the plurality of prism microstructures. Example 25 included a diffuser film 320 with the plurality of prism microstructures each having a 90° apex angle and a refractive index of 1.5 on one side facing the light guide film 100, and a plurality of four-sided pyramidal microstructures (1.5 refractive index) having a 110° apex angle and having faces oriented 45° relative to the plurality of prism microstructures. The four sided pyramidal structures may be either polarity that is either "bumps" or "depressions". The results of the on-axis brightness testing of Examples 21-25 relative to Comparative Example A are listed in Table VI below.

TABLE VI

Relative On-Axis Brightness Using Diffuser Films Having 1.50
Index 90° Apex Prisms on One Side and Conical and Pyramidal
Microstructures on Opposite Side in Back Light Unit

| Example | Diffuser Film Description | Light Guide Film Distribution | Reflector Type | Relative On-Axis Brightness |
|---|---|---|---|---|
| Comparative Example A | 50° FWHM circular volumetric diffuser | Narrow | Specular | 100% |
| Example 14 | 1.50 index 90° prism/40° FWHM circulardiffuser | Narrow | Specular | 113% |
| Example 21 | 1.50 index 90° prism/110° conical microstructures | Narrow | Specular | 111% |
| Example 22 | 1.57 index 90° prism/110° conical microstructures | Narrow | Specular | 107% |
| Example 23 | 1.50 index 90° prism/110° apex parallel pyramidal microstructures | Narrow | Specular | 111% |
| Example 24 | 1.50 index 90° prism/110° apex 45° oriented pyramidal microstructures | Narrow | Specular | 115% |
| Example 25 | 1.57 index 90° prism/110° apex 45° oriented pyramidal microstructures | Narrow | Specular | 112% |
| Example 17 | 1.57 index 90° prism/55° FWHM circular diffuser | Narrow | Specular | 109% |

The results indicate that the diffuser films 320 with the plurality of prism microstructures each having a 90° apex angle and a refractive index of 1.5 on one side and both the 110° apex angle conical microstructures and the 110° apex angle pyramidal microstructures on the opposite side performed well and increased the on-axis brightness as compared to Comparative Example A. In addition, the results indicate that increasing the refractive index of the prism microstructures from 1.50 to 1.57 decreases the relative on-axis brightness for the diffuser films with conical microstructures and pyramidal microstructures by 3-4%.

The apex angle and refractive index of the pyramid structures was investigated. Changing the apex angle of the pyramid from 110 to 90 degrees increased the brightness very significantly and unexpectedly from 115% to 127.5%. In addition, the refractive index of the pyramid microstructures was increased from 1.5 to 1.57 and this resulted in the brightness increasing from 127.5% to 129%.

Figure 17:
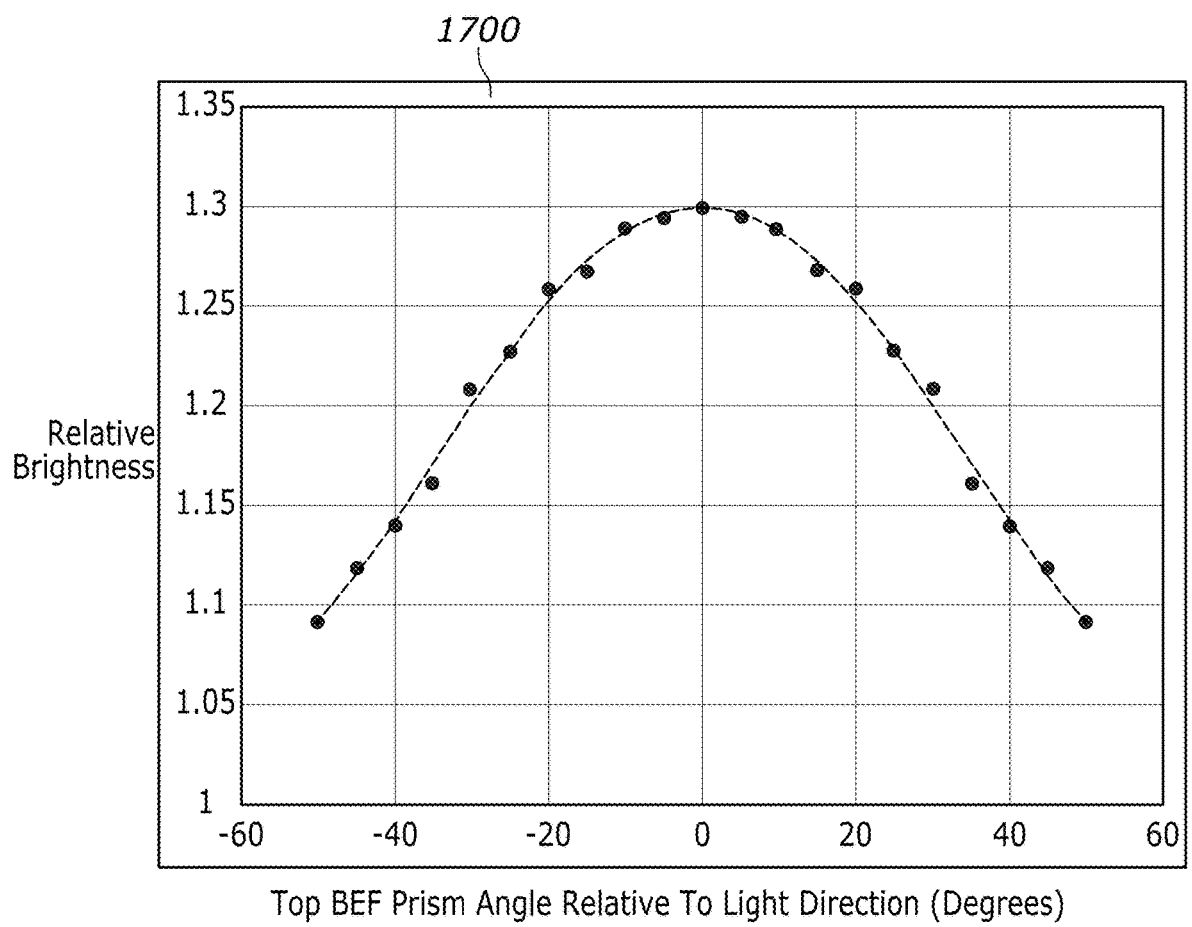
FIG. 17 is a graph of the relative brightness as a function of a top brightness enhancement film prism angle relative to the light direction for an edge-lit backlight unit of the present teaching.

One feature of the present teaching is that the orientation of the prism in the top BEF is important for diffuser films with ~90 degree-apex angle prisms (oriented parallel with prism in top BEF) with 1.5 refractive index and 90-degree apex angle 4-sided pyramid structures with refractive index 1.57 or 1.5 on the back side. This importance of this feature is illustrated in connection with FIG. 17 for pyramids with a 1.57 refractive index. FIG. 17 is a graph of the relative brightness as a function of a top brightness enhancement film prism angle relative to the light direction for an edge-lit backlight unit according to the present teaching. It can be seen that the largest brightness is achieved when the top BEF prism is within +−20 degrees of the light direction and especially when degrees of the light direction is within +−10 degrees. The performance is almost as good if the bottom prism of the BEF and of the diffuser are aligned with the light direction. The BEF orientation impacts the other diffuser films, but not as strongly.

Next, angle bending microstructures in place of the circular diffuser microstructures described above were investigated. Such angle bending microstructures are described in co-owned U.S. patent application Ser. No. 16/625,830, filed on Dec. 23, 2019 as the U.S. national stage application of International Patent Application No. PCT/US2018/040268, filed Jun. 29, 2018 and published as International Publication No. WO 2018/006288 A1 on Jan. 3, 2019, the entire content of which is hereby incorporated by reference. Specifically, the diffuser film 320 included a plurality of angle bending microstructures having the form of an array of microprisms illustrated in FIG. 8 of WO 2018/006288 A1 included on the side of the diffuser film 320 that is opposite the plurality of parallel prism microstructures. Both the plurality of angle bending microstructures and the plurality of parallel prism microstructures had a refractive index of 1.5. The plurality of angle bending microstructures were oriented such that the angle bending microstructures bent the light in a direction aligned with the plurality of prism microstructures and away from the LEDs 110 when placed in the back light unit 300 with the light guide film 100 having the narrow distribution output and the specular reflector 310 described above. The back light unit 300 with the diffuser film 320 having the plurality of angle bending microstructures had a performance enhancement over Comparative Example A equal to or better than the Examples listed in Tables III-V.

It is contemplated that other microstructures having different shapes and configurations than the ones disclosed herein may also be used on the side of the diffuser film 320 that faces away from the light guide film 100 and towards the pair of crossed brightness enhancement films 330, 340. The embodiments described herein are not intended to be limiting in any way.

Back Light Unit with Light Guide Film Having Wide Distribution and Diffusive Reflector The relative on-axis brightness of the light guide film having the wide distribution with the diffusive reflector described above, a 35° full width half maximum (FWHM) circular volumetric diffuser 320 typically used with such a light guide film and reflector (referred to herein as Comparative Example B), and a pair of crossed brightness enhancement films was measured as a base-line such that the relative on-axis brightness was set to 100.0%.

A series of circular diffuser films 320 having full width half maximum angles of diffusion ranging from 20° to 90°, were each substituted for the 35° full width half maximum (FWHM) circular volumetric diffuser film 320 of Comparative Example B, and the relative on-axis brightness was measured. Specifically, Example 26 included a 20° FWHM circular microstructure diffuser film 320, Example 27 included a 30° FWHM circular microstructure diffuser film 320, Example 28 included a 40° FWHM circular microstructure diffuser film 320, Example 29 included a 55° FWHM circular microstructure diffuser film, and Example 30 included a 90° FWHM circular microstructure diffuser film 320. The results of the on-axis brightness testing of Examples 26-30 relative to Comparative Example B are listed in Table VII below.

TABLE VII

Relative On-Axis Brightness Using Diffuser Films with Circular Diffuser Microstructures in Back Light Unit

| Example | Diffuser Film Description | Light Guide Film Distribution | Reflector Type | Relative On-Axis Brightness |
| --- | --- | --- | --- | --- |
| Comparative Example B | 35° FWHM circular volumetric diffuser | Wide | Diffusive | 100.0% |
| Example 26 | 20° FWHM circular diffuser microstructures | Wide | Diffusive | 100.7% |
| Example 27 | 30° FWHM circular diffuser microstructures | Wide | Diffusive | 100.4% |
| Example 28 | 40° FWHM circular diffuser microstructures | Wide | Diffusive | 100.7% |
| Example 29 | 55° FWHM circular diffuser microstructures | Wide | Diffusive | 99.9% |
| Example 30 | 90° FWHM circular diffuser microstructures | Wide | Diffusive | 100.1% |

Similar to the results with the light guide film having a narrow distribution and the specular reflector listed in Table I above, diffuser films 320 with different circular diffuser microstructures do not appear to have any significant impact on the on-axis brightness of the back light unit 300 that includes the light guide film 100 having a wide distribution and the diffusive reflector 310.

Next, four different diffuser films 320, each with a plurality of parallel prism microstructures on one side of the diffuser film 320 pointed towards the light guide film 100 and aligned in the same direction with the micro prisms of the brightness enhancement film that are closest to being aligned along the length L of the light guide film 100 were tested in the back light unit 300. The opposite sides of the diffuser films 320 that faced the bottom brightness enhancement films 330, 340 were smooth. Example 31 included a diffuser film 320 with the plurality of parallel prism microstructures each having a 90° apex angle and a refractive index of 1.5. Example 32 included a diffuser film 320 with the plurality of prism microstructures each having a 90° apex angle and a refractive index of 1.57. Example 33 included a diffuser film 320 with the plurality of prism microstructures each having a 90° apex angle and a refractive index of 1.65. Example 34 included a diffuser film 320 with the plurality of prism microstructures each having a 90° apex angle and a refractive index of 1.7. The results of the on-axis brightness testing of Examples 31-34 relative to Comparative Example B are listed in Table VIII.

TABLE VIII

Relative On-Axis Brightness Using Diffuser Films with 90° Apex Prisms on One Side in Back Light Unit

| Example | Diffuser Film Short Description | Light Guide Film Distribution | Reflector Type | Relative On-Axis Brightness |
| --- | --- | --- | --- | --- |
| Comparative Example B | 35° FWHM circular volumetric diffuser | Wide | Diffusive | 100.0% |

TABLE VIII-continued

Relative On-Axis Brightness Using Diffuser Films with 90° Apex Prisms on One Side in Back Light Unit

| Example | Diffuser Film Short Description | Light Guide Film Distribution | Reflector Type | Relative On-Axis Brightness |
| --- | --- | --- | --- | --- |
| Example 31 | 1.5 index 90° prism/smooth | Wide | Diffusive | 106.1% |
| Example 32 | 1.57 index 90° prism/smooth | Wide | Diffusive | 107.3% |
| Example 33 | 1.65 index 90° prism/smooth | Wide | Diffusive | 114.4% |
| Example 34 | 1.7 index 90° prism/smooth | Wide | Diffusive | 116.9% |

The results indicate that all of the diffuser films 320 having the plurality of prism microstructures on one side thereof increased the relative on-axis brightness of the back light unit 300, with the on-axis brightness increasing with the increasing refractive indices of the prisms. The results listed in Table VIII are in contrast with the results listed in Table II for the back light units 300 with the light guide film 100 having the narrow distribution and the specular reflector 310, described above, which indicated that the prisms caused a decrease in on-axis brightness.

Next, circular diffuser microstructures having various degrees of full width half maximum (FWHM) angles of diffusion were added to the smooth side of the diffuser film 320 of Example 31. Example 35 included a diffuser film 320 with the plurality of prism microstructures each having a 90° apex angle and a refractive index of 1.50 on one side facing the light guide film 100, and a plurality of circular diffuser microstructures having a 10° FWHM on an opposite side. Example 36 included a diffuser film 320 with the plurality of prism microstructures each having a 90° apex angle and a refractive index of 1.50 on one side facing the light guide film 100, and a plurality of circular diffuser microstructures having a 20° FWHM on an opposite side. Example 37 included a diffuser film 320 with the plurality of prism microstructures each having a 90° apex angle and a refractive index of 1.50 on one side facing the light guide film 100, and a plurality of circular diffuser microstructures having a 30° FWHM on an opposite side. Example 38 included a diffuser film 320 with the plurality of prism microstructures each having a 90° apex angle and a refractive index of 1.50 on one side facing the light guide film 100, and a plurality of circular diffuser microstructures having a 40° FWHM on an opposite side. Example 39 included a diffuser film 320 with the plurality of prism microstructures each having a 90° apex angle and a refractive index of 1.50 on one side facing the light guide film 100, and a plurality of circular diffuser microstructures having a 55° FWHM on an opposite side. In addition, circular diffuser microstructures having a 20° full width have maximum (FWHM) angle of diffusion were added to the smooth side of the diffuser film 320 of Example 34. Specifically, Example 40 included a diffuser film 320 with the plurality of prism microstructures each having a 90° apex angle and a refractive index of 1.7 on one side facing the light guide film 100, and a plurality of circular diffuser microstructures having a 20° FWHM on an opposite side. The results of the on-axis brightness testing of Examples 35-40 relative to Comparative Example B are listed in Table IX.

TABLE IX

Relative On-Axis Brightness of Diffuser Films with 1.50 or 1.57 Index 90° Apex Prisms on One Side and Circular Diffuser Microstructures on Opposite Side in Back Light Unit

| Example | Diffuser Film Description | Light Guide Film Distribution | Reflector Type | Relative On-Axis Brightness |
| --- | --- | --- | --- | --- |
| Comparative Example B | 35° FWHM circular volumetric diffuser | Wide | Diffusive | 100% |
| Example 31 | 1.50 index 90° prism/smooth | Wide | Diffusive | 106.1% |
| Example 35 | 1.50 index 90° prism/10° FWHM circular diffuser | Wide | Diffusive | 104.8% |
| Example 36 | 1.50 index 90° prism/20° FWHM circular diffuser | Wide | Diffusive | 104.3% |
| Example 37 | 1.50 index 90° prism/30° FWHM circular diffuser | Wide | Diffusive | 102.7% |
| Example 38 | 1.50 index 90° prism/40° FWHM circular diffuser | Wide | Diffusive | 104.6% |
| Example 39 | 1.50 index 90° prism/55° FWHM circular diffuser | Wide | Diffusive | 102.6% |
| Example 34 | 1.7 index 90° prism/smooth | Wide | Diffusive | 116.9% |
| Example 40 | 1.7 index 90° prism/20° FWHM circular diffuser | Wide | Diffusive | 102.6% |

The results indicate that having circular diffuser microstructures on the opposite side of the diffuser films 320 with a plurality of prism microstructures cause a decrease in on-axis brightness of the back light unit 300, but in some embodiments, a small amount of diffusion on the back side of the diffuser film 320 may be desirable to achieve adequate hiding of the scattering sites from the light guide film 100. The results also indicate that even though the back light unit 300 with the diffuser film 320 with 1.7 refractive index prism microstructures on one side and a smooth opposite side (Example 34) is much brighter than the back light unit 300 with the diffuser film 320 with 1.5 refractive index prism microstructures on one side and a smooth opposite side (Example 31), when 20° FWHM circular diffuser microstructures are added to the opposite side of the diffuser film 320 with prism microstructures, the back light unit with the diffuser film with 1.5 refractive index prism microstructures (Example 36) is somewhat brighter than the back light unit 300 with the diffuser film 320 with 1.7 prism microstructures (Example 40).

Next, the effect of the apex angle of the prisms was investigated. Example 41 included a diffuser film 320 with the plurality of prism microstructures each having an 80° apex angle and a refractive index of 1.5 on one side facing the light guide film 100, and a smooth opposite side. Example 42 included a diffuser film with the plurality of prism microstructures each having an 80° apex angle and a refractive index of 1.57 on one side facing the light guide film 100, and a smooth opposite side. Example 43 included a diffuser film with the plurality of prism microstructures each having an 80° apex angle and a refractive index of 1.65 on one side facing the light guide film 100, and a smooth opposite side. The results of the on-axis brightness testing of Examples 41-43 relative to Comparative Example B are listed in Table X.

TABLE X

Relative On-Axis Brightness Using Diffuser Films Having 80° Apex Prisms on One Side

| Example | Diffuser Film Description | Light Guide Film Distribution | Reflector Type | Relative On-Axis Brightness |
|---|---|---|---|---|
| Comparative Example B | 35° FWHM circular volumetric diffuser | Wide | Diffusive | 100% |
| Example 31 | 1.50 index 90° prism/smooth | Wide | Diffusive | 106% |
| Example 41 | 1.50 index 80° prism/smooth | Wide | Diffusive | 112% |
| Example 32 | 1.57 index 90° prism/smooth | Wide | Diffusive | 107% |
| Example 42 | 1.57 index 80° prism/smooth | Wide | Diffusive | 117% |
| Example 33 | 1.65 index 90° prism/smooth | Wide | Diffusive | 114% |
| Example 43 | 1.65 index 80° prism/smooth | Wide | Diffusive | 120% |

The results indicate that for each back light unit 300 with the diffuser film 320 with the plurality of prism microstructures each having an 80° apex angle, the on-axis brightness was increased over the back light unit 300 with the diffuser film 320 with the plurality of prism microstructures each having an 90° apex angle for the same refractive index.

Additional testing of diffuser films with plurality of prism microstructures each having an 80° apex angle with different refractive indices was completed. Example 44 included a diffuser film 320 with the plurality of prism microstructures each having an 80° apex angle and a refractive index of 1.61 on one side facing the light guide film 100, and a smooth opposite side. Example 45 included a diffuser film 320 with the plurality of prism microstructures each having an 80° apex angle and a refractive index of 1.62 on one side facing the light guide film 100, and a smooth opposite side. Example 46 included a diffuser film 320 with the plurality of prism microstructures each having an 80° apex angle and a refractive index of 1.63 on one side facing the light guide film 100, and a smooth opposite side. Example 47 included a diffuser film 320 with the plurality of prism microstructures each having an 80° apex angle and a refractive index of 1.64 on one side facing the light guide film 100, and a smooth opposite side. The results of the on-axis brightness testing of Examples 44-47 relative to Comparative Example B are listed in Table XI.

TABLE XI

Relative On-Axis Brightness Using Diffuser Films Having 80° Apex Prisms on One Side

| Example | Diffuser Film Description | Light Guide Film Distribution | Reflector Type | Relative On-Axis Brightness |
|---|---|---|---|---|
| Comparative Example B | 35° FWHM circular volumetric diffuser | Wide | Diffusive | 100% |
| Example 41 | 1.50 index 80° prism/smooth | Wide | Diffusive | 112% |
| Example 42 | 1.57 index 80° prism/smooth | Wide | Diffusive | 116% |
| Example 44 | 1.61 index 80° prism/smooth | Wide | Diffusive | 118% |
| Example 45 | 1.62 index 80° prism/smooth | Wide | Diffusive | 119% |
| Example 46 | 1.63 index 80° prism/smooth | Wide | Diffusive | 121% |
| Example 47 | 1.64 index 80° prism/smooth | Wide | Diffusive | 120% |
| Example 43 | 1.65 index 80° prism/smooth | Wide | Diffusive | 120% |

The results indicate that the optimal refractive index of the prism microstructures with an apex angle of 80° for the diffuser film 320 in combination with the light guide film 100 having a wide distribution and the diffusive reflector 310 is approximately between 1.63 and 1.65.

As described above, some amount of diffusion on the opposite side of the diffuser film 320 having the plurality of prism microstructures on one side may be desirable to improve the optical uniformity of the light exiting the back light unit 300 even at the expense of some decrease in brightness. The addition of some diffusion provided by the opposite side of the diffuser film 320 having the plurality of prism microstructures with an apex angle of 80° and a refractive index of 1.65 was investigated. Example 48 included a diffuser film 320 with the plurality of prism microstructures each having an 80° apex angle and a refractive index of 1.65 on one side, and a plurality of circular diffuser microstructures having a 3° FWHM on an opposite side. Example 49 included a diffuser film 320 with the plurality of prism microstructures each having an 80° apex angle and a refractive index of 1.65 on one side, and a plurality of circular diffuser microstructures having a 10° FWHM on an opposite side. The results of the on-axis brightness testing of Examples 48 and 49 relative to Comparative Example B are listed in Table XII.

TABLE XII

Relative On-Axis Brightness of Diffuser Films with 80° Apex Prisms on One Side and Circular Diffuser Microstructures on Opposite Side in Back Light Unit

| Example | Diffuser Film Description | Light Guide Film Distribution | Reflector Type | Relative On-Axis Brightness |
|---|---|---|---|---|
| Comparative Example B | 35° FWHM circular volumetric diffuser | Wide | Diffusive | 100% |
| Example 43 | 1.65 index 80° prism/smooth | Wide | Diffusive | 120% |
| Example 48 | 1.65 index 80° prism/3° FWHM circular diffuser | Wide | Diffusive | 117% |
| Example 49 | 1.65 index 80° prism/10° FWHM circular diffuser | Wide | Diffusive | 113% |

As indicated by the results listed in Table XII, adding a small amount of diffusion (by using the plurality of circular diffuser microstructures having a 3° FWHM or 10° FWHM) to the opposite side of the diffuser film 320 with the plurality of prism microstructures each having an 80° apex angle and a refractive index of 1.65 on one side decreases the on-axis brightness of the back light unit 300 when used with the light guide film 100 having the wide distribution and the diffusive reflector 310. This result is in contrast to using the diffuser film 320 with the plurality of prism microstructures on one side and adding significant amount of diffusion to the opposite side in the back light unit 300 with the light guide film 100 having the narrow distribution and the specular reflector 310, which increased the on-axis brightness, as indicated above in Tables III-VI.

Figure 14:
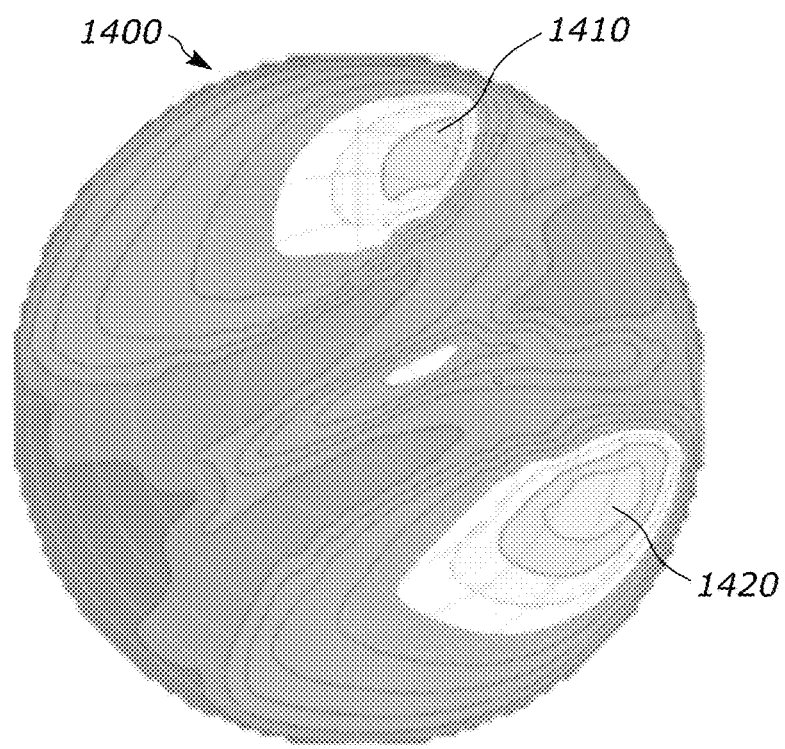
FIG. 14 is a two-dimensional plot of a distribution of light output from a top surface of a diffuser positioned at the top surface of an edge-lit light guide film having a wide distribution with the diffuse reflector positioned at a bottom surface of the edge-lit light guide film, as measured by a goniophotometer, in accordance with an embodiment of the invention.
Figure 15:
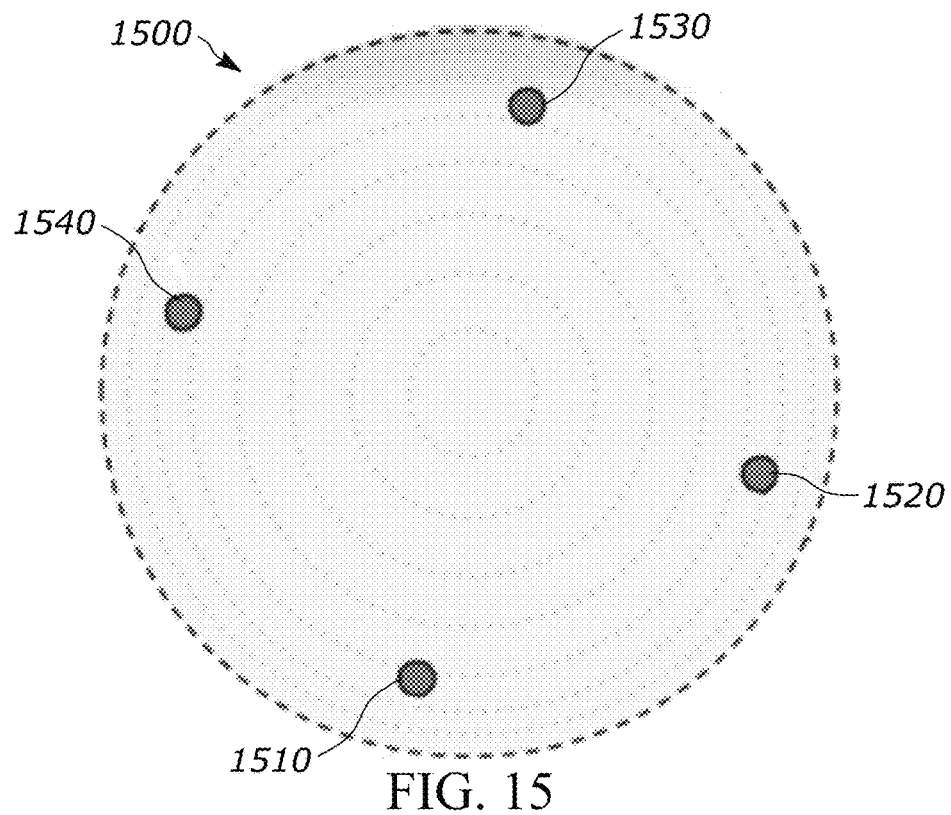
FIG. 15 is a schematic two-dimensional representation of the defined angles from which light that approaching the pair of crossed brightness enhancement films can transmit through the pair of crossed brightness enhancement films on axis and normal to a top surface of the edge-lit light guide film.
Figure 16:
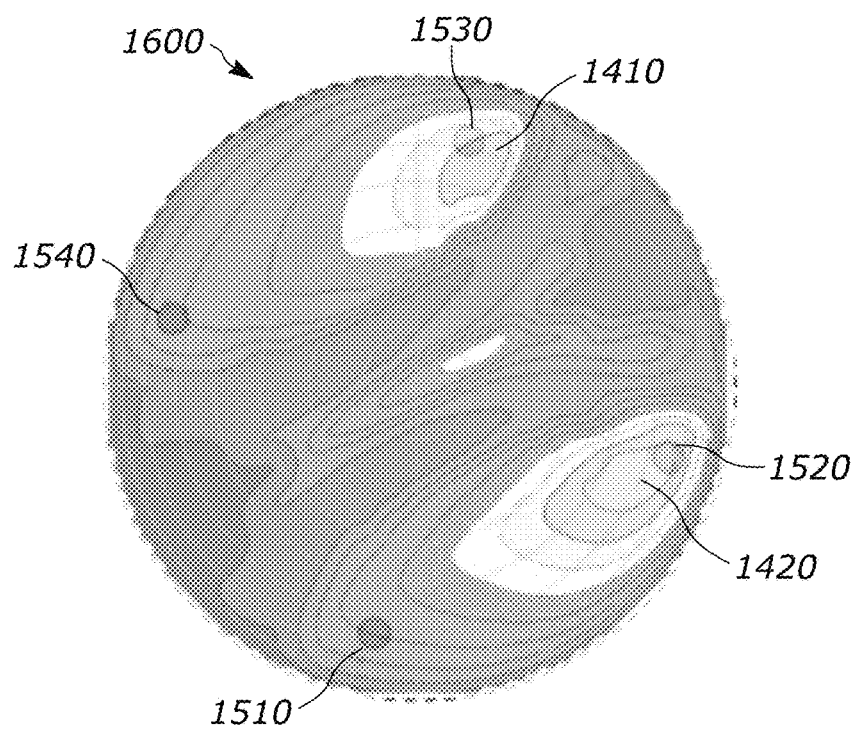
FIG. 16 is a combination of FIG. 14 and FIG. 15.

To illustrate how the diffuser film 320 of one embodiment of the invention, specifically the diffuser film used in Example 48 with the plurality of prism microstructures each having an 80° apex angle and a refractive index of 1.65 on one side facing the light guide film 100, and a plurality of circular diffuser microstructures having a 3° FWHM on an opposite side performs in the back light unit 300, the angular light distribution of the combination of the Example 48 diffuser film 320 with the light guide film 100 having the wide distribution and the diffusive reflector 310 was measured and compared with the acceptance angle criteria for the crossed brightness enhancement films 330, 340. FIG. 14 illustrates the measured angular light distribution 1400 of the combination of this diffuser film 320 of Example 48 with the light guide film 100 having the wide distribution and the diffusive reflector 310, with areas 1410 and 1420 in FIG. 14 indicating highest intensity of light passing through. FIG. 15 illustrates the acceptance angle criteria 1500 of the crossed brightness enhancement films 330, 340 used in the back light unit 300, with areas 1510, 1520, 1530, 1540 indicating the locations where light will pass through the crossed brightness enhancement films 330, 340 on-axis. The combination of FIGS. 14 and 15 is represented by 1600 in FIG. 16 and indicates an excellent match between the diffuser film 320 with the plurality of prism microstructures each having an 80° apex angle and a refractive index of 1.65 on one side, and a plurality of circular diffuser microstructures having a 3° FWHM on an opposite side, light guide film 100 having the wide distribution and the diffusive reflector 320, and the input criteria of the crossed brightness enhancement films 330, 340 of the back light unit 300.

The inventors have discovered that one of the best diffuser films 320 to use with the light guide film 100 having the narrow distribution output with the specular reflector 310 included the plurality of prism microstructures each having a 90° apex angle and a refractive index of 1.5 on one side and circular diffuser microstructures with a 55° FWHM angle of diffusion (used in Example 15). By contrast, one of the best diffuser films 320 to use with the light guide film 100 having the wide distribution output with the diffusive reflector included the plurality of prism microstructures each having an 80° apex angle and a refractive index of 1.64 on one side and a smooth opposite side (used in Example 47). To see how each of these diffuser films 320 performed in the back light unit 300 that included the other light guide film 100 and reflector 310, additional testing was completed.

Example 50 included the diffuser film 320 with the plurality of prism microstructures each having an 80° apex angle and a refractive index of 1.64 on one side facing the light guide film 100 and a smooth opposite side, the light guide film 100 with the narrow distribution output, the specular reflector 310, and the pair of crossed brightness enhancement films 330, 340. A comparison of the on-axis brightness results of Example 50 relative to Comparative Example A is listed along with Example 15 and Comparative Example A in Table XIII below.

TABLE XIII

Relative On-Axis Brightness of Diffuser Films with Light Guide Film Having Narrow Distribution and Specular Reflector in Back Light Unit

| Example | Diffuser Film Description | Light Guide Film Distribution | Reflector Type | Relative On-Axis Brightness |
|---|---|---|---|---|
| Comparative Example A | 50° FWHM circular volumetric diffuser | Narrow | Specular | 100% |
| Example 15 | 1.5 index 90° prism/55° FWHM circular diffuser | Narrow | Specular | 112% |
| Example 50 | 1.64 index 80° prism/smooth | Narrow | Specular | 104% |

The results indicate that Example 15 provided much higher on-axis brightness than Example 50, although even Example 50 was a slight an improvement over Comparative Example A.

Example 51 included the diffuser film 320 with the plurality of prism microstructures each having a 90° apex angle and a refractive index of 1.5 on one side facing the light guide film 100 and circular diffuser microstructures with a 55° FWHM angle of diffusion on the opposite side, the light guide film 100 with the wide distribution output, the diffusive reflector 310, and the pair of crossed brightness enhancement films 330, 340. A comparison of the on-axis brightness results of Example 51 relative to Comparative Example B is listed along with Example 47 and Comparative Example B in Table XIV below.

TABLE XIV

Relative On-Axis Brightness of Diffuser Films with Light Guide Film Having Wide Distribution and Diffusive Reflector in Back Light Unit

| Example | Diffuser Film Description | Light Guide Film Distribution | Reflector Type | Relative On-Axis Brightness |
|---|---|---|---|---|
| Comparative Example B | 35° FWHM circular volumetric diffuser | Wide | Diffusive | 100% |
| Example 51 | 1.5 index 90° prism/55° FWHM circular diffuser | Wide | Diffusive | 102% |
| Example 47 | 1.64 index 80° prism/smooth | Wide | Diffusive | 120% |

The results indicate that Example 47 provided much higher on-axis brightness than Example 51, although even Example 51 was a slight improvement over Comparative Example B.

It is evident from Tables XIII and XIV that the best diffuser film 320 for use with one light guide film-reflector combination in the back light unit 300 performs poorly for the other light guide film-reflector combination.

The illustrated and above-described embodiments are not intended to be limiting in any way, and any such modifications to the embodiments described herein are intended to be included within the spirit and scope of the present disclosure and protected by the claims that follow.

What is claimed is:

1. An edge-lit back light unit for a backlit display, the edge-lit back light unit comprising:
   a specular reflector;
   an edge-lit light guide film positioned above the specular reflector, the edge-lit light guide film having a length and a width, wherein a combination of the edge-lit light guide film and the specular reflector is configured to provide a peak optical distribution of 15° to 20° and a full width half maximum angle of diffusion of 25° to 45°;

a diffuser film positioned above the edge-lit light guide film, the diffuser film having a plurality of parallel prism microstructures on one side thereof facing the edge-lit light guide film, at least some of the plurality of parallel prism microstructures having an apex angle of 78° to 92° and being formed of a material having a refractive index of 1.49 to 1.58, and a plurality of diffuser microstructures on an opposite side thereof, the diffuser microstructures having a full width half maximum angle of diffusion of 30° to 60°; and a pair of crossed brightness enhancement films positioned above the diffuser film, at least one of the brightness enhancement films having a plurality of parallel micro prisms on one side thereof and facing away from the diffuser film, wherein the plurality of parallel micro prisms of one of the brightness enhancement films is oriented perpendicular to the plurality of micro prisms of the other brightness enhancement film, wherein the plurality of prism microstructures of the diffuser film is substantially aligned with the plurality of parallel micro prisms of at least one of the brightness enhancement films.

2. The edge-lit back light unit according to claim 1, wherein the at least one of the brightness enhancement films comprises the plurality of parallel micro prisms that is oriented to be most closely aligned with a light direction.

3. The edge-lit back light unit according to claim 2, wherein the at least one of the brightness enhancement films is positioned at a top of the edge-lit back light unit.

4. The edge-lit back light unit according to claim 1, wherein the diffuser microstructures are formed in a circular shape.

5. The edge-lit back light unit according to claim 1, wherein the diffuser microstructures are formed in a conical shape.

6. The edge-lit back light unit according to claim 5, wherein the conical shape of the diffuser microstructures have an apex angle of about 110°.

7. The edge-lit back light unit according to claim 1, wherein the diffuser microstructures are formed in a four-sided pyramidal shape.

8. The edge-lit back light unit according to claim 7, wherein the four-sided pyramidal microstructures have an apex angle of about 110°.

9. The edge-lit back light unit according to claim 7, wherein the four-sided pyramidal microstructures have an apex angle of about 90°.

10. The edge-lit back light unit according to claim 7, wherein the four-sided pyramidal microstructures are formed of a material having a refractive index of about 1.57.

11. The edge-lit back light unit according to claim 7, wherein at least some faces of the four-sided pyramidal microstructures are aligned to be parallel to the prism microstructures of the diffuser film.

12. The edge-lit back light unit according to claim 7, wherein at least some faces of the four-sided pyramidal microstructures are aligned to be parallel to the prism microstructures of the diffuser film to within less than or equal to 10 degrees.

13. The edge-lit back light unit according to claim 7, wherein at least some faces of the four-sided pyramidal microstructures are aligned to be parallel to the prism microstructures of the diffuser film to within less than or equal to 20 degrees.

14. The edge-lit back light unit according to claim 13, wherein the at least one of the brightness enhancement films comprises the plurality of parallel micro prisms that is oriented to be most closely aligned with a light direction.

15. The edge-lit back light unit according to claim 7, wherein at least some faces of the four-sided pyramidal microstructures are oriented about 45° relative to the prism microstructures of the diffuser film.

16. The edge-lit back light unit according to claim 15, wherein the at least one of the brightness enhancement films comprises the plurality of parallel micro prisms that is oriented to be most closely aligned with a light direction.

17. The edge-lit back light unit according to claim 1, further comprising a plurality of LEDs positioned along the width of the light guide film.

18. The edge-lit back light unit according to claim 15, wherein the diffuser microstructures are angle-bending microstructures oriented to bend light in a direction aligned with the plurality of prism microstructures and away from the plurality of LEDs.

19. An edge-lit back light unit for a backlit display, the edge-lit back light unit comprising:
a diffusive reflector;
an edge-lit light guide film positioned above the diffusive reflector, the edge-lit light guide film having a length and a width, wherein a combination of the edge-lit light guide film and the diffusive reflector is configured to provide a peak optical distribution of 30° to 50° and a full width half maximum angle of diffusion of 55° to 85°;
a diffuser film positioned above the edge-lit light guide film, the diffuser film having a plurality of parallel prism microstructures on one side thereof facing the edge-lit light guide film, at least some of the plurality of parallel prism microstructures having an apex angle between 75° and 85° and a refractive index between 1.59 and 1.67, and a plurality of diffuser microstructures on an opposite side thereof, the diffuser microstructures having a full width half maximum angle of diffusion of less than 20°; and
a pair of crossed brightness enhancement films positioned above the diffuser film, at least one of the brightness enhancement films having a plurality of parallel micro prisms on one side thereof and facing away from the diffuser film, wherein the plurality of parallel micro prisms of one of the brightness enhancement films is oriented perpendicular to the plurality of micro prisms of the other brightness enhancement film,
wherein the plurality of prism microstructures of the diffuser film is substantially aligned with the plurality of parallel micro prisms of at least one of the pair of crossed brightness enhancement films.

20. The edge-lit back light unit according to claim 19, wherein the plurality of parallel micro prisms of the at least one of the pair of crossed brightness enhancement films is oriented to be most closely aligned with a light direction.

21. The edge-lit back light unit according to claim 20, wherein the at least one of the pair of crossed brightness enhancement films is positioned at a top of the edge-lit back light unit.

22. The edge-lit back light unit according to claim 19, wherein the diffuser microstructures are formed in a circular shape.

23. The edge-lit back light unit according to claim 19, wherein the diffuser microstructures are configured to have a full width half maximum angle of diffusion that is less than or equal to 10°.

24. The edge-lit back light unit according to claim 19, wherein the diffuser microstructures are configured to have a full width half maximum angle of diffusion of less than or equal to 5°.

25. A back light unit comprising:
a specular reflector;
a light guide film positioned above the specular reflector, the light guide film configured to guide light along a light direction;
a diffuser film positioned above the light guide film, the diffuser film having a plurality of parallel prism microstructures on one side thereof facing the light guide film, at least some of the plurality of parallel prism microstructures having a prism apex direction, the diffuser film further having a plurality of pyramid microstructures on an opposite side thereof, at least some of plurality of the pyramid microstructures having a common pyramid apex direction;
a first brightness enhancement film positioned above the diffuser film having a plurality of parallel prism microstructures on one side thereof facing away from the diffuser, at least some of the plurality of parallel prism microstructures of the first brightness enhancing film having a common prism apex direction; and
a second brightness enhancement film positioned above the first brightness enhancement film having a plurality of parallel prism microstructures on one side thereof facing away from the first brightness enhancement film, at least some of the plurality of parallel prism microstructures of the second brightness enhancing film having a common prism apex direction;
wherein the common prism apex direction of at least one of the first and second brightness enhancement film is oriented substantially along the light direction, the common prism apex direction of the diffuser film is oriented substantially along the common prism apex direction of at least one of the first and second brightness enhancement film, and the common pyramid apex direction of the diffuser film is oriented at a desired angle with respect to the common prism apex direction of the diffuser film.

26. The back light unit of claim 25, wherein the common prism apex direction of the at least one of the first and second brightness enhancement film having the prism apex direction oriented substantially along the light direction has a prism apex direction that is less than ten degrees from the light direction.

27. The back light unit of claim 25, wherein the common prism apex direction of at least one of the first and second brightness enhancement film having the prism apex direction oriented substantially along the light direction has a prism apex direction that is less than twenty degrees from the light direction.

28. The back light unit of claim 25, wherein the desired angle is substantially zero degrees.

29. The back light unit of claim 25, wherein the desired angle is substantially 45 degrees.

30. The back light unit of claim 25, wherein the other of the at least one of the first and second brightness enhancement film has a prism apex direction that is oriented substantially perpendicular to the prism apex direction of the at least one of the first and second brightness enhancement film.

31. The back light unit of claim 25, wherein the at least one of the first and second brightness enhancement film having the prism apex direction oriented substantially along the light direction is positioned at the top of the back light unit.

32. The back light unit of claim 25, wherein at least some of the plurality of parallel prism microstructures of the diffuser film have an apex angle from 78° to 94°.

33. The back light unit of claim 25, wherein at least some of the plurality of parallel prism microstructures of the diffuser film are formed of a material having a refractive index from 1.5 to 1.66.

34. The back light unit of claim 25, wherein at least some of the plurality of pyramid microstructures of the diffuser film have an apex angle from 84° to 114°.

35. The back light unit of claim 25, wherein at least some of the plurality of pyramid microstructures of the diffuser film are formed of a material having a refractive index of 1.5 to 1.65.

36. The back light unit of claim 25, wherein at least some of the plurality of parallel prism microstructures of at least one of the first and second brightness enhancing film have an apex angle from 86° to 94°.

37. The back light unit of claim 25, wherein at least some of the plurality of parallel prism microstructures of at least one of the first and second brightness enhancing film are formed of a material having a refractive index from 1.57 to 1.7.

\* \* \* \* \*